(12) United States Patent
Pallen et al.

(10) Patent No.: US 10,341,860 B2
(45) Date of Patent: Jul. 2, 2019

(54) LEARNED DUAL BAND WIFI NETWORK ASSOCIATION

(71) Applicant: Apple Inc., Cupertino, CA (US)

(72) Inventors: Vinesh Pallen, Sunnyvale, CA (US); Hyeonkuk Jeong, Saratoga, CA (US); Kapil Chhabra, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/672,829

(22) Filed: Aug. 9, 2017

(65) Prior Publication Data

US 2017/0339739 A1 Nov. 23, 2017

Related U.S. Application Data

(63) Continuation of application No. 14/625,986, filed on Feb. 19, 2015, now Pat. No. 9,743,450.

(60) Provisional application No. 62/046,792, filed on Sep. 5, 2014.

(51) Int. Cl.
*H04W 12/04* (2009.01)
*H04W 76/15* (2018.01)
*H04W 12/06* (2009.01)
*H04W 84/12* (2009.01)

(52) U.S. Cl.
CPC ........... *H04W 12/04* (2013.01); *H04W 76/15* (2018.02); *H04W 12/06* (2013.01); *H04W 84/12* (2013.01)

(58) Field of Classification Search
CPC .................................................. H04W 12/04
See application file for complete search history.

(56) References Cited

U.S. PATENT DOCUMENTS

| 2008/0192925 A1* | 8/2008 | Sachs ................. H04L 12/5692 380/29 |
| 2013/0176897 A1 | 7/2013 | Wang et al. |
| 2013/0223423 A1 | 8/2013 | Lee et al. |
| 2014/0254349 A1 | 9/2014 | Jia et al. |
| 2015/0023341 A1 | 1/2015 | Zhao et al. |
| 2015/0139032 A1 | 5/2015 | Ko et al. |
| 2015/0382281 A1 | 12/2015 | Sirotkin |
| 2016/0066326 A1 | 3/2016 | Choi et al. |

(Continued)

OTHER PUBLICATIONS

Non-Final Office Action dated Oct. 31, 2016 in U.S. Appl. No. 14/625,986. 12 pages.

(Continued)

*Primary Examiner* — Jason E Mattis
(74) *Attorney, Agent, or Firm* — Kilpatrick, Townsend & Stockton

(57) ABSTRACT

Systems, devices, and methods are described for allowing a first device to learn how to connect to a first network using information that a second device obtained about a second network that is related to the first network. The second device can perform a virtual network discovery of the first network on behalf of the first device. The second device can describe how to initiate one or more connections to the first network by modifying the information the second device obtained about the second network. The second device can send the information identifying how to initiate the connections to the first network to the first device. The first device can automatically initiate connections to the first network without requiring user input.

20 Claims, 8 Drawing Sheets

(56) References Cited

U.S. PATENT DOCUMENTS

2016/0219504 A1   7/2016  Cho et al.

OTHER PUBLICATIONS

Restriction Requirement dated Jul. 15, 2016 in U.S. Appl. No. 14/625,986. 7 pages.
Notice of Allowance dated Apr. 21, 2017 in U.S. Appl. No. 14/625,986. 9 pages.

* cited by examiner

LEARNED DUAL BAND WIFI NETWORK ASSOCIATION

CROSS REFERENCE TO RELATED APPLICATIONS

This application is a continuation of U.S. patent application Ser. No. 14/625,986, entitled, "Learned Dual Band WIFI Network Association Method," filed Feb. 19, 2015, which claims the benefit of U.S. Provisional Application No. 62/046,792, filed Sep. 5, 2014, which are both hereby incorporated by reference in their entirety for all purposes.

FIELD

The described embodiments relate generally to mobile devices, including prediction of one or more network connection parameters by a mobile device using network connection information provided by one or more other devices.

BACKGROUND

Recent advances in portable computing have made mobile electronic devices, such as laptops, palmtops, mobile phones, smart phones, multimedia phones, portable media players, global positioning system (GPS) units, mobile gaming systems, etc., quite popular. Many users carry a device almost everywhere they go and use their device for a variety of purposes, including making and receiving phone calls, sending and receiving text messages and emails, navigation (e.g., using maps and/or a GPS receiver), purchasing items in stores (e.g., using contactless payment systems), sharing photos, listening to music or watching videos, and/or accessing the Internet (e.g., to look up information). A user's mobile device can be carried or worn and can perform a variety of smart functions in addition to traditional functions formerly implemented by a single application-specific device.

Mobile devices can have applications that access a variety of content, such as email and websites, photos, streaming audio/video, social media, and the like. Some applications can periodically receive notifications from services that new content is available. Such a service can "push" content to an application on a mobile device or send a notification to the application that new content is available. When the notification is received at the application, the application can then retrieve the new content. These services (e.g., update/upgrade services, news services, web blog services, podcast services, social networking services, or the like) allow users of mobile devices to interact with content wherever they may be.

The increase in the use of mobile devices magnifies the complexity of how users interact with content on their devices. One problem with this is that each one of a user's devices can have different capabilities, either in hardware or in software. Thus, users typically have to adapt to how they interact with the content from device to device. Furthermore, as mobile devices become smaller and integrate more functionality, new and innovative ways are needed to facilitate connectivity of mobile devices.

Accordingly, it is desirable to provide improved coordinating and handling of how devices connect to communications networks.

SUMMARY

Systems, devices, and methods are described for allowing a first device to learn how to connect to a first wireless network related to a second wireless network. The first wireless network can have a predicted relationship (as determined by a second device) to the second wireless network. For instance, the second device can perform a network discovery on behalf of the first device to determine first connection information associated with the first wireless network based on second connection information associated with the second wireless network.

As an example, to obtain the first connection information associated with the first wireless network (e.g., including a first identifier associated with the first wireless network), the second device can modify the second connection information associated with the second wireless network according to the predicted relationship (e.g., modifying a second identifier associated with the second wireless network). The first device can obtain the first connection information generated by the second device and use the first connection information to initiate a connection to the first wireless network. The first device can determine to connect to the first wireless network based on obtaining the first identifier associated with the first wireless network from the first connection information.

In some embodiments, the second device can associate security (authentication) information, which is used for connecting to the second wireless network, with the first wireless network. The second device can send the security information to the first device with the first connection information, thereby enabling the first device to connect to the first wireless network when it is a secured network. As examples, the security information may include a digital signature, encryption key, passphrase, wired equivalent privacy (WEP) key, Wi-Fi protected access (WPA/WPA2) key, authentication information, or the like that may be required to establish a connection.

A further understanding of the nature of and equivalents to the subject matter of this disclosure (as well as any inherent or express advantages and improvements provided) should be realized in addition to the above section by reference to the remaining portions of this disclosure, any accompanying drawings, and the claims.

BRIEF DESCRIPTION OF THE DRAWINGS

In order to reasonably describe and illustrate those innovations, embodiments, and/or examples found within this disclosure, reference may be made to one or more accompanying drawings. The additional details or examples used to describe the one or more accompanying drawings should not be considered as limitations to the scope of any of the claimed inventions, any of the presently described embodiments and/or examples, or the presently understood best mode of any innovations presented within this disclosure.

DETAILED DESCRIPTION

Figure 1:
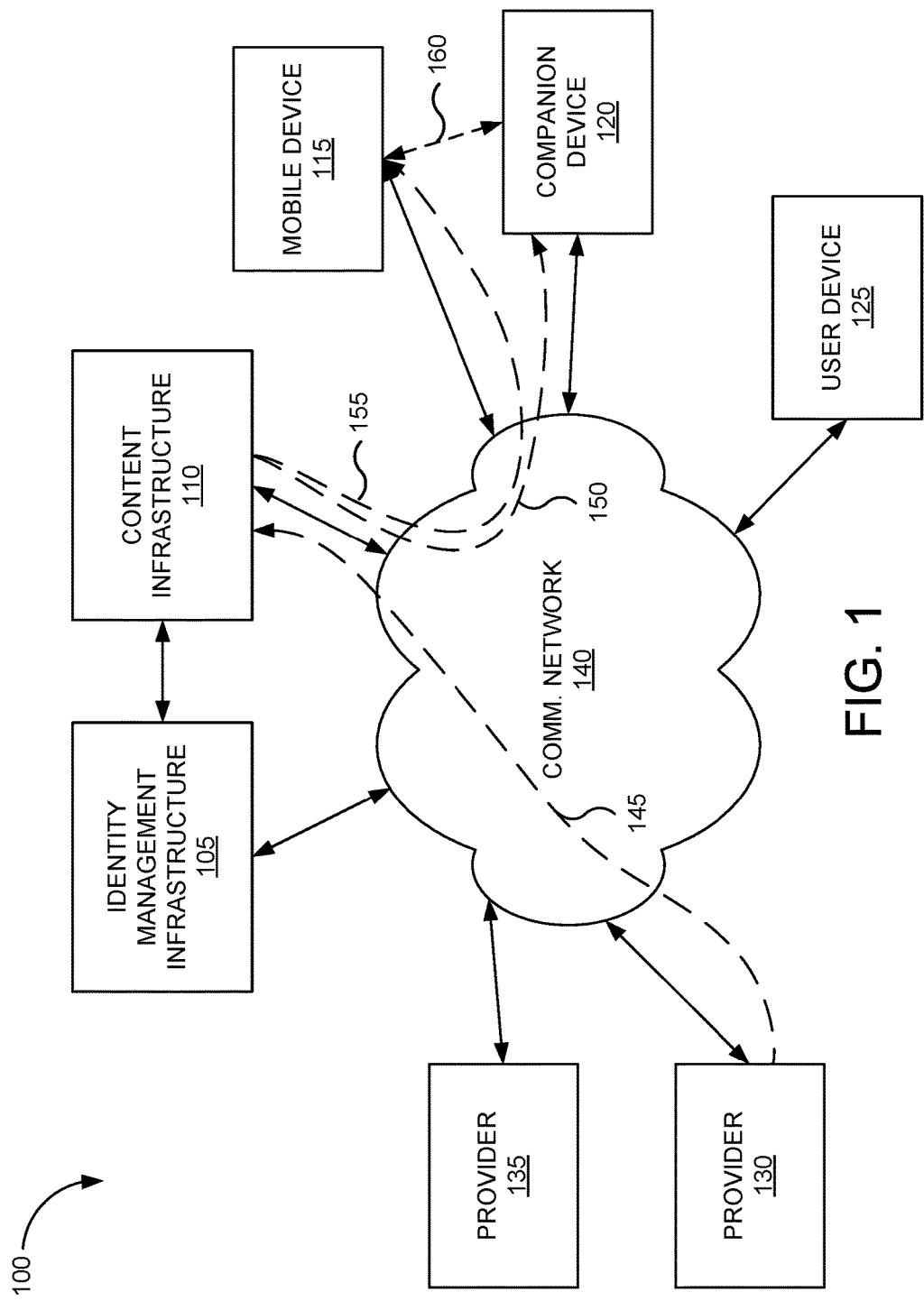
FIG. 1 is a block diagram of an example device management and content delivery ecosystem.

Some mobile devices (e.g., smart watches or other wearable devices) can have a small user interface, and thus may be difficult to program to connect to a network. It can be convenient for such mobile devices, rather than receiving connection information associated with the network manually from users, to obtain the connection information from another device (e.g., a companion device owned by the same user who owns the mobile device). Moreover, the hardware of some of these mobile devices may not be as capable as the hardware of other devices, such as smartphones, tablets, laptops, etc. These other devices might connect to a different type of network (e.g., different frequencies) than the mobile devices are capable. Therefore, connection information received from the other devices about these different types of networks may be of little to no direct use to the mobile devices.

In some embodiments, a first device can connect to a first network (e.g., with a wired or wireless connection) related to a second network. The first network can have a predicted relationship to the second network as determined by a second device. The second device can act as a facilitator to enable the first device to connect to the first network. The second device can generate first connection information associated with the first network from second connection information associated with the second network based on the predicted relationship. The second device can establish a connection with the first device and distribute the first connection information associated with the first wireless network to the first device.

The second device (i.e., a companion device) can have a previously established relationship with the first device (i.e., a mobile device) before sending the first connection information to the first device. In some embodiments, the second device can learn about the first network via the second network and can generate the first connection information on behalf of the first device. The second device can send the first connection information to the first device to allow the first device to connect to the first network. For example, the second device can identify one or more characteristics of the second network and predict a relationship between the characteristics of the second network and the first network. To determine the first connection information (e.g., a first identifier associated with the first network), the second device can modify the characteristics of the second network (e.g., modify a second identifier associated with the second network). This modification can act as a virtual network discovery of the first network by predicting network connection information of the first network. By providing the predicted network information, the second device can enable the first device to connect, for example, automatically to the first network.

In certain embodiments, the second device can associate security information used to access the second network with the first network. The second device can distribute the security information having been associated with the first network to the first device. The first device can use the security information to initiate one or more connections to the first network, e.g., without user input.

I. Introduction

A system of devices and servers and their communication is first described, where the system includes a companion device and a mobile device. These embodiments are helpful in later descriptions of how and when synchronizing network connection information between the mobile device and the companion device can be employed and the variety of reasons for these devices to initiate connections automatically to networks. The establishment of a relationship between the mobile device and the companion device is also described. This relationship can be helpful in synchronizing network connection information between the mobile device and the companion device.

A. Device Management and Content Delivery Ecosystem

FIG. 1 is a block diagram of example device management and content delivery ecosystem 100. FIG. 1 and other figures are illustrative of embodiments or implementations disclosed herein and should not limit the scope of any claim. One of ordinary skill in the art may recognize through this disclosure and the teachings presented herein other variations, modifications, and/or alternatives to those embodiments or implementations illustrated in the figures. The devices in device management and content delivery ecosystem 100 can include hardware and/or software elements.

Device management and content delivery ecosystem 100 includes an identity management infrastructure 105, content infrastructure 110 (e.g., one or more servers that implement a voice/video call service, a messaging service, and/or a push notification service), mobile device 115, companion device 120, user device 125, provider 130, provider 135, and communications network 140. Identity management infrastructure 105, content infrastructure 110, mobile device 115, companion device 120, user device 125, provider 130, and provider 135 are each capable of communicating with and through communications network 140 (representing the Internet, wide area networks (WANs), metropolitan area networks (MANs), local area networks (LANs), wireless area networks (WLANs), radio access network (RANs), public switched telephone network (PTSN), etc., and/or combinations of the same). Mobile device 115 can communicate directly with companion device 120 without utilizing communications network 140.

Identity management infrastructure 105 can provide management of individual entities, together with the management of their authentication, authorization, and privileges within or across device management and content delivery ecosystem 100. Identity management infrastructure 105 can be implemented using a single server computer system or may include multiple server computer systems, web servers, application servers, networks, interconnects, or the like. Identity management infrastructure 105 can provide identity management services that include technologies and services such as Active Directory, identity providers, password managers, access control providers, single sign-on (SSO) services, OAuth, security token services, or the like.

Identity management infrastructure 105 can maintain information that authenticates the identity of a managed entity (such as a user, organization, and any associated devices, resources, services, applications, or the like). Identity management infrastructure 105 can verify that an entity is who/what it claims to be using a password, passphrase, biometrics such as a fingerprint, a distinctive behavior such as a gesture pattern on a touchscreen, one or more challengeresponse protocols, one-time passwords (OTPs), 2-way authentications, and other techniques. Identity management infrastructure 105 can manage authorization information that defines what operations an entity can perform in the context of a specific application, service, or resource. Some authorizations may be based on a role, device type, application, application type, or the like associated with a managed entity. Users are granted roles often related to a particular job or job function. Identity management infrastructure 105 can also manage descriptive information about managed entities and how and by whom that information can be accessed and modified.

Identity management infrastructure 105 can create one or more digital identities for managed entities. A digital identity can include entity identifying information (personally identifiable information or PII) and ancillary information. A managed entity can have multiple digital identities and each digital identity can encompass multiple attributes. A user can have a user identifier (e.g., a phone number, e-mail, etc.) that is linked to multiple devices. In addition to the creation, deletion, and modification of digital identities, identity management infrastructure 105 can manage ancillary entity data for use by services, such as content infrastructure 110.

Identity management infrastructure 105 can receive a single user identifier, which is used to determine device identifiers for devices associated with the user identifier. During entity registration, in order to access services or resources managed by identity management infrastructure 105, one or more user identifiers and one or more unique entity (device) identifiers may be combined to generate a token (e.g., an entity or device token). In various embodiments, a token can be encrypted by applying a hashing algorithm (e.g., SHA-0, SHA-1, SHA-2, MD5, Whirlpool, or other hashing algorithms). The token generated and encrypted for an entity can remain constant. Once a token has been generated and encrypted by identity management infrastructure 105, the token can be sent back to the entity requesting registration. The entity in some aspects can then distribute the token to services or resources managed by identity management infrastructure 105 or to other third party services for a variety of purposes relating to authentication, authorization, accounting, or the like, of the entity at those managed services or resources or the trusted delivery of content to the entity by the third parties.

In various embodiments, identity management infrastructure 105 can provide the management of the authentication, authorization, and privileges of a user's devices for synchronizing network connection information. A user can designate that all or some of the devices that are registered to the user with identity management infrastructure 105 participate in synchronizing network connection information. Therefore, one or more devices registered to the user with identity management infrastructure 105 can learn how to initiate connections to one or more networks, e.g., without user input, using network connection information synchronized between the devices.

Content infrastructure 110 can provide services for synchronizing network connection information between devices. Content infrastructure 110 can provide content and/or content related services within or across device management and content delivery ecosystem 100. Content infrastructure 110 can be protected by and/or accessible to entities managed by identity management infrastructure 105. Content infrastructure 110 can be implemented in various embodiments using a single server computer system or may include multiple server computer systems, web servers, application servers, networks, interconnects, and the like.

Content infrastructure 110 can provide content to mobile device 115, companion device 120, and user device 125 as well as to other devices and entities. Examples of content include a text message, a multimedia message, image or video data, an impending calendar event, an audio/video call (e.g., using VoIP), a notification of new data on a remote server, or network connection information generated by companion device 120 and used by mobile device 115 to automatically initiate one or more connections to one or more networks. In certain embodiments, content can originate from one or more sources managed by identity management infrastructure 105. In certain embodiments, content can be provided directly by content infrastructure 110. In some embodiments, content can originate from one or more other sources. For example, content may originate from any one of mobile device 115, companion device 120, user device 125, and providers 130 and 135. In another example, content may be received from one or more external sources such as the Internet, cellular networks, public switched telephone networks, or the like connected to device management and content delivery ecosystem 100.

Content infrastructure 110 can route content to mobile device 115, companion device 120, user device 125, and providers 130 and 135. In one example, content infrastructure 110 may manage the transfer of an SMS message received from or destined to a cellular network. In another example, content infrastructure 110 may manage the connection of a voice call received from or destined to a public switched telephone network.

Companion device 120 can act and send signals on behalf of mobile device 115. In these embodiments, companion device 120 acts as a main or intermediary device and mobile device 115 acts as a proxied device. In some embodiments, content infrastructure 110 can coordinate whether companion device 120 acts and sends signals on behalf of mobile device 115 for content managed by content infrastructure 110.

In certain embodiments, content infrastructure 110 can send content to more than one device, when appropriate. A user may be associated with both mobile device 115 and companion device 120. Content infrastructure 110 may route the content to both mobile device 115 and companion device 120, such as to have a VoIP phone call ring on both devices or to have a message appear in the inbox of the same application installed on both devices. In other embodiments, content is sent to only one device, e.g., to companion device 120, which may forward a call to mobile device 115. When a phone/video call is being forwarded to a device, an identifier such as a phone number can identify which device is to receive the call, and that device can relay the call as appropriate.

Content can include one or more pieces of data, such as a device identifier (or token) as discussed above and a payload. A device token can be provided in content originating from a provider (e.g., provider 130 and/or 135), a device of a same user (e.g., from either mobile device 115 or companion device 120), or a device of another user (e.g., user device 125), together with any payload the provider seeks to have delivered using content infrastructure 110. The device token can contain information that enables content infrastructure 110 to locate a device on which a particular service or client application is installed and that is registered to receive the content. The payload may include new information received at a server application or a reference to where the information is to be found. The payload may further include a property list that specifies how the user is to be alerted about this new information by the particular service or client application.

An alert can come in a variety of forms. For example, content can be displayed as an alert message or other visual representation, such as a badge associated with an application icon. Availability of the content further can be announced by playing a sound when an alert or badge is shown. When a user is notified that an application or service has a message, event, or other content data for them, they can launch the application or service and see the details by either viewing the content, viewing information contained in a push notification, having the client application retrieve the referenced information, or the like. The user can also choose to ignore the notification, in which case the application is not activated.

Content infrastructure 110 can include push notification services that, in addition to or in the alternative of routing content, implement mechanisms to give client applications of push providers that are on user devices the ability to let users know that new content is available at one or more server applications, is on the device, or is incoming. A push provider (or simply provider) as used herein can refer to an entity having information to be forward and/or delivered using a push notification infrastructure. Generally, software developers (acting as providers) originate notifications in their server software when new data is available for users. A provider connects its server software with content infrastructure 110 through a persistent and secure channel. Identity management infrastructure 105 can ensure that the provider is authenticated (e.g., that the provider is who the provider alleges to be) and authorized to connect and utilizes content infrastructure 110 in a trusted manner.

While monitoring for incoming data intended for its client applications, when new data for an application arrives, the provider can prepare and send a notification through its channel connection to content infrastructure 110, which pushes the notification to a push consumer or destination target device. Identity management infrastructure 105 can also ensure that the consumer or destination target device is authenticated and authorized to connect to and to utilize services of content infrastructure 110 in a trusted manner. A push consumer (or simply consumer or destination) can refer to an entity designated to receive information forwarded and/or delivered using content infrastructure 110. Although the above describes a provider as the originator of content or a notification of available content for the sake of simplicity, a provider in one instance may in turn become a consumer in another, and vice versa. Additionally, mobile device 115 may be a provider of content to companion device 120, and vice versa, as well has provider 130 providing content to provider 135, and vice versa.

One or more server computers of content infrastructure 110 can provide, provision, manage, and otherwise operate the push notification service for propagating information between mobile device 115, companion device 120, user device 125, provider 130, and provider 135. Mobile device 115, companion device 120, user device 125, provider 130, and provider 135 may each establish at least one persistent connection (e.g., an accredited and encrypted Internet protocol (IP) connection) with content infrastructure 110 to originate and/or receive content over this persistent connection. As noted above, connections to content infrastructure 110 can be authenticated and authorized by identity management infrastructure 105.

If a notification delivered by content infrastructure 110 for an application associated with a user's device arrives when the application is not running, the user's device may alert the user that the application has data waiting for it, as discussed above. Content infrastructure 110 may also provide a default quality-of-service component that provides store-and-forward capabilities. If content infrastructure 110 attempts to deliver a notification, but the user's device is offline, the notification can be stored for a limited period of time (e.g., a day or a week) and delivered to the user's device when the user's device connects to content infrastructure 110. In some embodiments, content infrastructure 110 can store all recent notifications for a particular application. In some embodiments, content infrastructure 110 can store only the most recent notification for a particular application. In other embodiments, content infrastructure 110 can discard any stored notifications for the user's device when the user's device remains offline after the limited period of time.

Provider 130 and provider 135 may be implemented in various embodiments using a single server computer system or may include multiple server computer systems, web servers, application servers, networks, interconnects, and the like. In various aspects, provider 130 and provider 135 provide client applications that run on mobile device 115, companion device 120, and user device 125 and server applications that provide one or more services to which the client applications can connect. Provider 130 and provider 135 may seek to notify the client applications accessible to one or more of mobile device 115, companion device 120, and user device 125 that information is available to their respective users.

In various aspects, a push provider is a software developer, company, or organization that maintains server software configured to interact with one or more client applications on one or more of mobile device 115, companion device 120, and user device 125. Provider 130 and provider 135 each connect with content infrastructure 110 through a persistent and secure channel while monitoring incoming data intended for their client applications. In some embodiments, provider 130 and provider 135 connect over a binary interface that provides a high-speed, high-capacity interface, e.g., using a streaming TCP socket design in conjunction with binary content. The binary interface may be synchronous or asynchronous. For each interface, TLS (or SSL) may be used to establish a secured communications channel.

Mobile device 115, companion device 120, and user device 125 each may be embodiment as a single device, a single computer system, multiple devices, or multiple computer systems. In various aspects, mobile device 115, companion device 120, and user device 125 although labeled differently for convenience can each be embodied as a mobile device, a wearable device, or other mobile device (e.g., a laptop, palmtop, mobile phone, smart phone, multimedia phone, portable media player, GPS unit, mobile gaming systems, etc.). As examples, a wearable device can be a wrist worn device, a device that is clipped or pinned to the user's clothing, a device with a lanyard or chain that is wearable around the user's neck, a headband device, eyeglasses, or any other device that can be secured to the user's person or clothing.

In addition to or in the alternative, companion device 120 and user device 125 can be embodied as described above as well as being embodied as personal computer systems, mainframes, server computer systems, cloud services, or the like. Mobile device 115, companion device 120, and user device 125 may include a variety of technologies that provide a communications connection. Some examples of connection technologies include wired connections (e.g., Ethernet, fiber, digital subscriber line (DSL), etc.) and wireless connections (e.g., WiFi, Bluetooth, WiMax, 3G, 4G, LTE, etc.).

Mobile device 115, companion device 120, and user device 125 can host one or more of a variety of client applications that communicate with one or more server applications provided by one or more providers (e.g., providers 130 and 135). These client applications may include applications specific to the intended function of a device (such as telephony applications or GPS applications) as well as e-mail clients, update/upgrade clients, news clients, web/blog clients, podcast clients, social networking clients, or other types of client applications where notification messages may be sent. These client applications may represent to a user one or more notification messages received using content infrastructure 110. Notifications can be represented to users in one or more manners defined by an operating system of the device, a graphical user interface toolkit, and/or the applications themselves. Some examples of representations of notifications include a new e-mail indicator, a new news item indicator, a new podcast indicator, a change of on-line status of a social networking friend, and the like. In various embodiments, another service operating on a device can handle notifications for client applications.

Mobile device 115, companion device 120, and user device 125 can receive an identifier (or device token) when a client application initially connects with content infrastructure 110 in order to receive push notifications. Providers 130 and 135 can use the token, or include the token, with any content or notification message so that it can be appropriately forwarded back to the device using content infrastructure 110. In various embodiments, to ensure trust, a provider communicates the token every time it connects with content infrastructure 110. Content infrastructure 110 can decrypt the device token and validate using identity management infrastructure 105 that the token was generated for the destination device. To validate the token, content infrastructure 110 can ensure that the device identifier contained in the token matches, e.g. corresponds to, the device identifier in a device certificate used when the device registered with identity management infrastructure 105.

In some embodiments, operations of content infrastructure 110 can be to forward or otherwise communicate content received from provider 130 as illustrated by path 145. Provider 130 can send an authentication Secure Sockets Layer (SSL) certificate upon an initial connection with content infrastructure 110. Identity management infrastructure 105 can authenticate and authorize provider 130 as a registered and authorized sender of push notifications. This SSL certificate can also be configured with additional user-defined data. Identity management infrastructure 105 can utilize the additional user-defined data to identify provider 130 in a trusted fashion. Other secure communications protocols (e.g., cryptographic protocols such as Transport Layer Security (TLS), etc.) can be used in other embodiments.

Where provider 130 is associated with a particular application and includes additional identifying (e.g., user-defined) data within the SSL certificate, identity management infrastructure 105 can authenticate provider 130 and automatically provision push services for provider 130 and the application utilizing content infrastructure 110. In other words, identity management infrastructure 105 can automatically extract any additional identifying data from the authentication certificate and have content infrastructure 110 attach the additional identifying data (or a portion of the data) to content (e.g., push-notification messages). In some embodiments, the additional identifying data may identify a topic or feed associated with provider 130 (or an application of provider 130) to which a user might subscribe via content infrastructure 110. Thus, the additional information in the authentication certificate can be leveraged to direct content to devices that have subscribed to the topic/feed or requested information regarding the topic/feed. In this way, push service is automatically provisioned for provider 130.

Once provider 130 is trusted, content infrastructure 110 can receive content from provider 130. The content may include a device token. Having received the content from provider 130, content infrastructure 110 determines the destination for the content. In various embodiments, the destination is determined based on the device token that is sent along with the content. In some embodiments, it is not necessary to send destination information as part of a token. By determining or extracting the destination from the device token or otherwise obtaining destination information for the content, content infrastructure 110 can then determine whether the destination is "online" or otherwise accessible.

If the destination is online, content infrastructure 110 can route the content to the destination companion device 120 illustrated by path 150, for example, via a connection between companion device 120 and content infrastructure 110. If the destination is "offline" or otherwise inaccessible to content infrastructure 110, the content may be stored, with delivery retried at a later time. Content infrastructure 110 can, in addition to or alternatively, route the content to mobile device 115 illustrated by path 155, for example, via a connection between mobile device 115 and content infrastructure 110. Content infrastructure 110 thus can route content to a single device, multiple devices at the same time, or to one device for delivery to another device.

Companion device 120 can deliver or otherwise route content to mobile device 115 as illustrated by path 160. Companion device 120 can deliver content received from content infrastructure 110 or content generated by companion device 120. Companion device 120 can deliver network connection information to mobile device 115. A user can designate that mobile device 115 participates in synchronizing network connection information with companion device 120. Therefore, mobile device 115 can learn how to initiate connections to one or more networks without user input or intervention based on network connection information received from companion device 120.

B. Establishing Device Relationships

Mobile device 115 (e.g., as a first device) can receive network connection information about a first wireless network to which the mobile device has not previously connected. Companion device 120 (e.g., as a second device) can determine the network connection information of the first wireless network based on connection information of a second wireless network that is related to the first wireless network. In some embodiments, companion device 120 and mobile device 115 can establish a relationship before (or as part of) communicating such network connection information between the devices.

Figure 2:
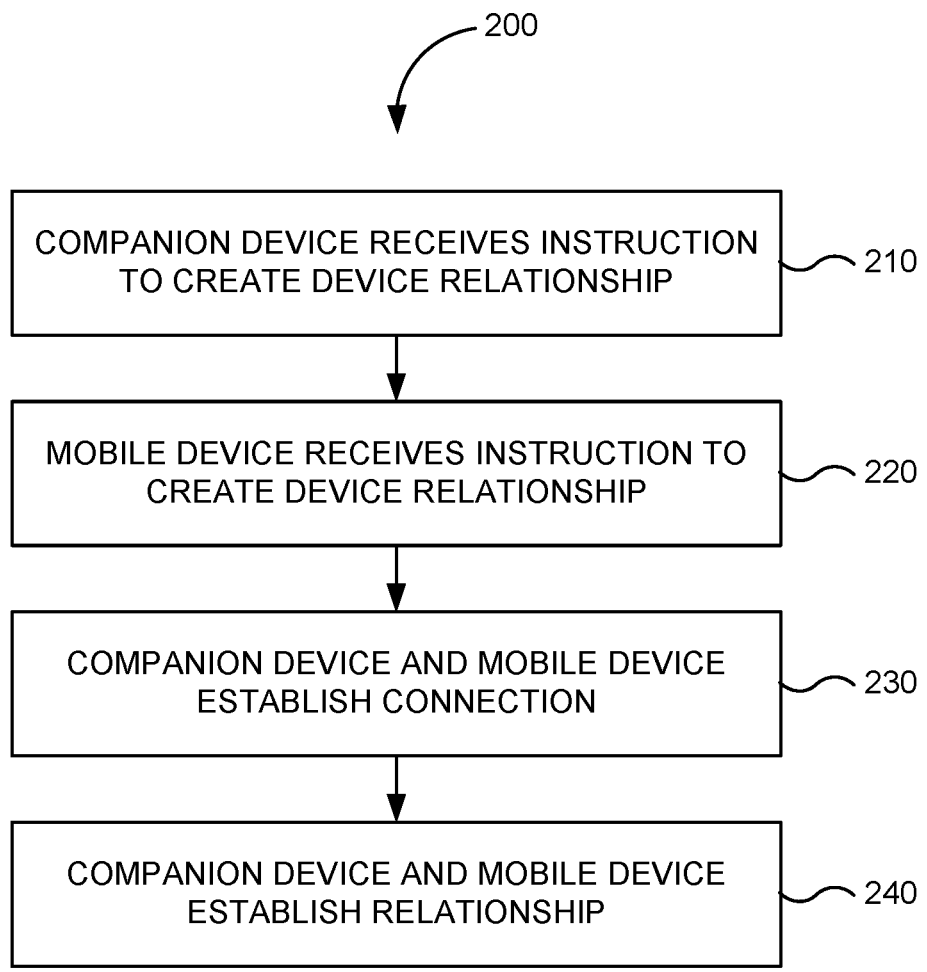
FIG. 2 is a flowchart of an example method for creation of relationships between companion devices and mobile devices.

FIG. 2 is a flowchart of example method 200 for creating relationships between companion devices and mobile devices. In some embodiments, if a companion device has a relationship with the mobile device (e.g., being paired with a mobile device, configured to automatically connect to a mobile device, etc.), the companion device can send network connection information that the companion device generates to the mobile device. The mobile device can use the network connection information to determine whether to connect to a network described therein. Thus, the creation of a relationship between the companion device and the mobile device can help the mobile device connect to a network.

In step 210, a companion device (e.g., companion device 120) receives an instruction to create a device relationship. A device relationship as used herein refers to a communication link between at least two devices. The communication link can be established between the two devices using a wired or a wireless connection. In various embodiments, a user of the companion device can provide the instruction to create the device relationship by placing the companion device into a relationship creation mode (e.g., a pairing mode). In some embodiments, firmware or software of the companion device can provide the instruction to create the device relationship automatically upon detecting one or more other devices.

In step 220, a mobile device (e.g., mobile device 115) receives an instruction to create a device relationship. In certain embodiments, the companion device and the mobile device can implement the Bluetooth® wireless communication protocol used for exchanging data and for "device association" or "device pairing." Bluetooth® wireless devices can be associated (e.g., connected and paired together) by first exchanging shared, verifiable information wirelessly, to enable the subject wireless devices to "trust" each other, prior to establishing interactive sessions conducted via open Bluetooth® wireless radio communications. In some embodiments, a device relationship is created between the companion device and the mobile device, as each device connects to device management and content delivery ecosystem 100 of FIG. 1 using wired or wireless interfaces.

In step 230, the companion device and mobile device establish a connection. For example, to establish a connection, the companion device and mobile device may perform a handshake, sending and receiving a set of requests, replies, nonces, etc. During the handshake, the companion device and mobile device can establish one or more connection parameters (e.g., sequence number) for either direction of communication. After the handshake, both the companion device and mobile device can receive an acknowledgment of the connection.

In step 240, once connected, the companion device and the mobile device establish a device relationship. The companion device and the mobile device can identify the other device as being "trusted" and may attempt to establish a connection without user intervention (for example, as soon as they are in range). The companion device and the mobile device can create the parameters for encrypted links so the data that they exchange is protected against eavesdropping. The companion device and the mobile device can use the device relationship to share information. For example, the companion device can use the device relationship to send and receive data and instructions on behalf of the mobile device. The mobile device can use the device relationship to make use of hardware and/or software capabilities of the companion device.

In some embodiments, a companion device having a device relationship with a mobile device can send network connection information to the mobile device. The network connection information obtained from the companion device can allow the mobile device to connect automatically to a first network having a predicted relationship (as determined by the companion device) to a second network. The companion device may use information about the second network to generate the network connection information for the first network. The mobile device can use the network connection information generated by the companion device to determine whether and/or how to connect to the first network, e.g., without further user input.

Processing in method 200 and other methods described herein may be performed by software (e.g., instructions or code modules) when executed by one or more processing units (e.g., CPU, processor, or the like) of a logic machine, such as a computer system or information processing device, by hardware components of an electronic device (e.g., logic circuitry), or by combinations of software and hardware elements.

II. Learned Network Association

Some embodiments relate to a device (e.g., companion device 120) acting as a facilitator for another device (e.g., mobile device 115) to enable the other device to establish a connection to a first network predicted by the device to have a relationship with a second network, to which the device has connected. The terms "companion device" and "mobile device" are used for ease of identifying the two devices, but impart no specific limitation or requirement of the devices. A discussion of network connection is provided below, and then followed by a description of a companion device providing network connection information to a mobile device.

A. Network Association By A Device

A device (e.g., mobile device 115 or companion device 120) can connect using one or more wired or wireless interfaces to one or more wired or wireless networks. Some examples of wired or wireless interfaces that can be used therewith include Ethernet interfaces, fiber network interfaces, 802.11 type wireless network interfaces, cellular network interfaces, or the like. Some examples of networks and communication protocols that can be used therewith include time division multiple access (TDMA), code division multiple access (CDMA), global system for mobile communications (GSM), Enhanced Data GSM Environment (EDGE), wideband code division multiple access (W-CDMA), Long Term Evolution (LTE), LTE-Advanced, WiFi (such as IEEE 802.11a, IEEE 802.11b, IEEE 802.11g, IEEE 802.11n and/or IEEE 802.11ac), Bluetooth, Wi-MAX, voice over Internet Protocol (VoIP), near field communication protocol (NFC), a protocol for email, instant messaging, and/or a short message service (SMS), or any other suitable communication protocol, including communication protocols not yet developed as of the filing date of this document.

In some embodiments, insertion of an Ethernet cable into an appropriate Ethernet jack of the device may cause the device to seek to join a local area network (LAN). The device can include wired circuitry that can communicate over several different types of wired networks. The device can include wireless circuitry that can communicate over several different types of wireless networks depending on the range required for the communication. For example, any one or more of a short-range wireless transceiver (e.g., Bluetooth), a medium-range wireless transceiver (e.g., WiFi), and/or a long range wireless transceiver (e.g., GSM/GPRS, UMTS, CDMA2000 1x/EV-DO and LTE/LTE-Advanced) can be used depending on the type of communication or the range of the communication. A user may prefer one type of connection to another that maximizes throughput, minimizes interference, or otherwise provides a more satisfactory user experience. In embodiments where the device includes one or more radios (transceivers) which handle different frequencies, the device may detect the presence of wireless access points, cellular towers, or the like and initiate a connection to (join) a wireless LAN or cellular network.

The device can collect information about wired or wireless networks detected by the device or to which the device connects. The device can describe each network by a network identifier, the type of the network, the capabilities of the network, or other characteristics of the network. The device can use information obtained about the network to establish one or more connections to the network.

For IEEE 802.11 type wireless networks, the device can collect information from beacons that are regularly broadcast by an access point. The wireless LAN (WLAN) beacon frame can contain configuration information about the access point, such as the service set identifier (SSID) or the network name, the supported bit rates, specific signaling methods and other parameter sets, and security configuration and other capabilities information for that WLAN. The beacon allows WLAN clients to know what networks are available in the area. This allows the wireless LAN clients to try to associate with a chosen network.

Multiple WLANs can coexist in one airspace. Each WLAN thus needs a unique name—the SSID of the wireless network. The SSID keeps the packets within the correct WLAN, even when overlapping WLANs are present. There can be multiple access points within each WLAN and an access point can create multiple WLANs. Each access point has its own basic SSID (BSSID) and a BSSID is included in all wireless packets. To accommodate multiple BSSIDs, an access point can be assigned a unique block of MAC addresses (e.g., 64). Most often, as with modern home wireless routers, there are different BSSIDs within an assigned block of an access point for each WLAN configured on a radio. For example, a dual-band access point can have one radio with two sets of frequencies (e.g., 2.4 GHz and 5 GHz) or can have two radios (e.g., one for 2.4 GHz and one for 5 GHz). The different frequencies correspond to different WLANs of the dual-band access points. Multiple BSSIDs can result if a WLAN is configured on each set of frequencies or on each radio. Each radio can have a set of MAC addresses and support a number of SSIDs, with one MAC address assigned to each SSID as a BSSID. MAC addresses for an access point are typically assigned based on the base MAC address of the access point. Therefore, in most instances, BSSIDs associated with the same access point fall within a range of variation from the base MAC address of the access point.

In some embodiments, the device can collect security information of the wired or wireless networks detected by the device or to which the device connects. For example, if the device wishes to initiate a connection to a LAN/WLAN using the Institute of Electrical and Electronics Engineers, Inc. (IEEE) 802.1X authentication, the device can provide credentials to an authenticator, such as an authentication device provided as an Ethernet switch or wireless access point, which provides security to protect the network. The device may not be allowed access through the authenticator to the protected side of the network until the device's identity has been validated and authorized. With 802.1X port-based authentication, the device can provide credentials, such as user name/password or digital certificate, to the authenticator. The authenticator may perform verification or forward the credentials to another authentication device (e.g., identity management infrastructure 105) for verification. If the authentication server determines the credentials are valid, the device is allowed to access resources located on the protected side of the network.

If the device wishes to initiate a connection to an IEEE 802.11 type wireless network, the device can provide an encryption key or passphrase to an access point. 802.11 authentication is a first step in network attachment. In 802.11 authentication, the device (station) establishes its identity with an access point (AP) or broadband wireless router. The 802.11 standard defines two link-level types of authentication: Open System and Shared Key. Open system authentication consists of two communications. The first is an authentication request from the mobile device that contains the station ID (typically the MAC address). This is followed by an authentication response from the AP/router containing a success or failure message. With shared key authentication, a shared key or passphrase is manually set on both the mobile device and the AP/router. There are several types of shared key authentication available today for home or small office wireless local area network (WLAN) environments, such as Wired Equivalent Privacy (WEP), Wi-Fi Protected Access (WPA), which enforces 802.1X authentication and key-exchange and only works with dynamic encryption keys, and Wi-Fi Protected Access 2 (WPA2).

Once authentication with the authentication device is complete, the device can associate (register) with the AP/router to gain full access to the network. Association allows the AP/router to record each device so that frames may be properly delivered. After the device authenticates to an AP/router, the device sends an association request. The AP/router processes the association request and when the AP/router grants association, it responds with a status code of 0 (successful) and the association ID (AID). The AP/router can then forward frames to/from the device.

The device can collect and store security information about the wired or wireless networks connected to by the device. As examples, the device can store a digital signature, encryption key, passphrase, wired equivalent privacy (WEP) key, Wi-Fi protected access (WPA/WPA2) key, authentication information, or the like as security information that may be required to establish connections. The device may store the security information in memory, e.g., a secure memory location, such as a device keychain. The device can later retrieve the security information from the memory and use the security information to establish one or more connections to the network.

B. Network Association on Behalf of a Device

In some embodiments, a companion device (e.g., companion device 120 of FIG. 1) can act as a facilitator to a mobile device (e.g., mobile device 115 of FIG. 1) to allow the mobile device to determine whether to connect to a first network having a predicted relationship to a second network, e.g., to which the companion device has connected. The first network and the second network can correspond to different frequencies provided by a same access point. The companion device can facilitate network association of the mobile device to the first network by providing, to the mobile device, first connection information of the first network derived from second connection information of the second network. The companion device can generate the first connection information (e.g., generate a first identifier associated with the first network) by modifying the second connection information of the second network (e.g., modifying a second identifier associated with the second network). The mobile device can use the first connection information of the first network to determine whether to connect to the first network. In some implementations, connections to the first network can be made by the mobile device just as if the mobile device had gone through its own initial network association process with the first network.

Figure 3:
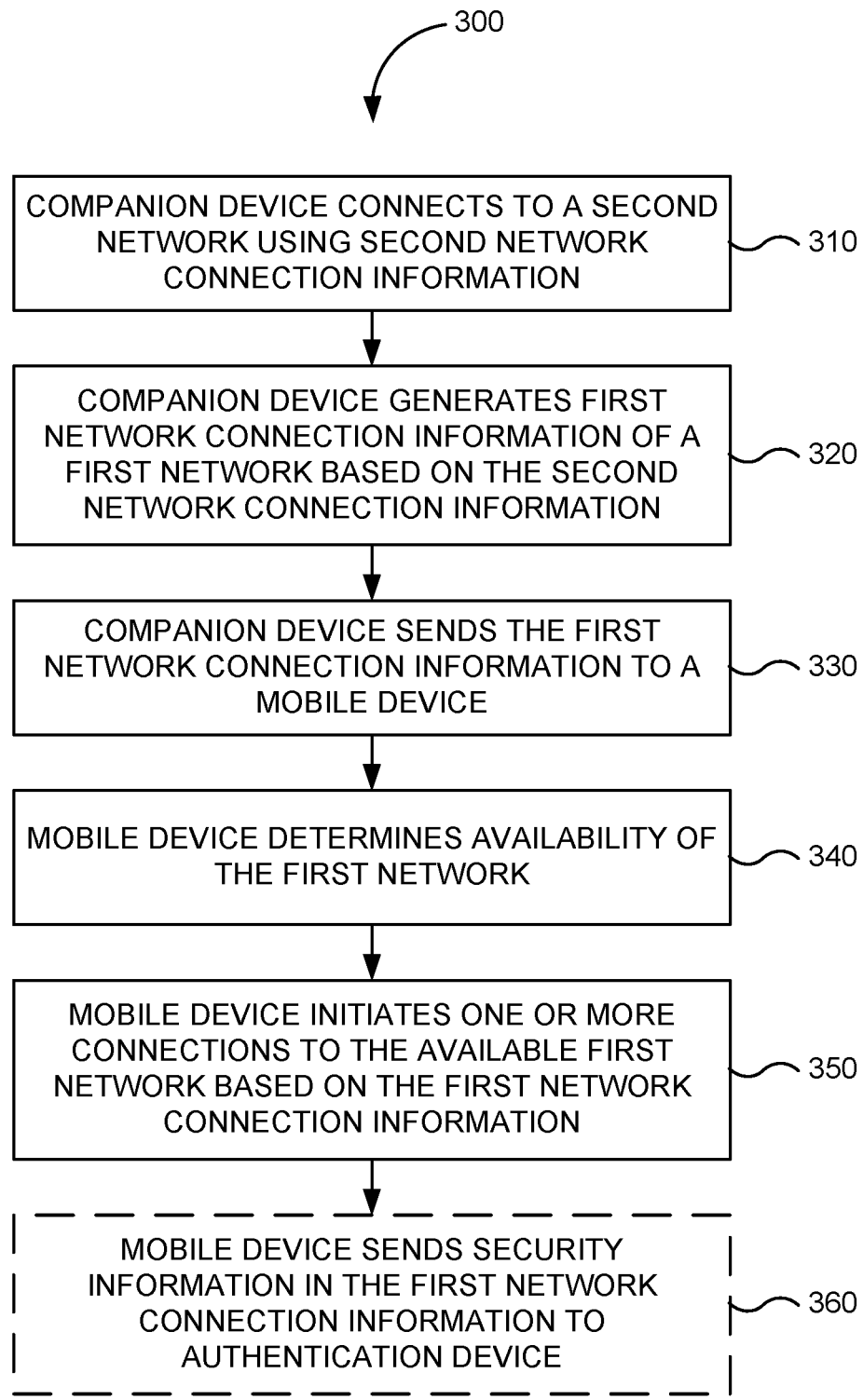
FIG. 3 is a flowchart of an example method for synchronizing network connection information between mobile devices and companion devices.

FIG. 3 is a flowchart of an example method 300 for synchronizing network connection information between mobile devices and companion devices. In some embodiments, the companion device and the mobile device can have the same or similar capabilities. In other embodiments, a companion device to a mobile device may be a device having more processing power, more memory, bigger batteries, more advanced radios or additional frequencies, larger displays, additional human interface devices, or the like than the mobile device. The mobile device may have a reduced feature set in comparison to the companion device, e.g., the mobile device may have a radio with fewer frequencies. Method 300 describes steps performed by both devices. In the discussion below, the "second network" is used to determine characteristics of the "first network," although the terms first and second are arbitrary adjectives and could refer to the opposite network as indicated by the context. Further, embodiments can involve multiple first and second networks.

In step 310, a companion device connects to the second network using second network connection information. The companion device can connect to the second network using one or more wired or wireless interfaces. For a wired connection, insertion of an Ethernet cable into an appropriate Ethernet jack of the companion device may cause the companion device to seek to join a local area network (LAN) to connect to the second network. In some embodiments, the companion device connects to the second network by associating with an access point that creates a wireless network. During the association process, the companion device can collect one or more characteristics of the second network, such as a BSSID, network capabilities, security parameters, or the like. The second connection information can comprise one or more characteristics of the second network obtained by the second device.

In step 320, the companion device generates first network connection information based the second network connection information. The companion device can generate the first network connection information using the second network information collected when initially associating with the second network or when re-establishing connections to the second network. The companion device can include one or more predicted characteristics of the first network in the first network connection information. The first network connection information can enable the mobile device to initiate one or more connections to the first network automatically without user input. The first network connection information can include any or all of one or more network identifiers for the first network (e.g., media access control or MAC address, SSID, BSSID, etc.), one or more capabilities offered by the first network or access point to the first network (e.g., supported bit rates, specific signaling methods and other parameter sets, etc.), security information used to establish a connection to the first network (e.g., digital signatures, certificates, credentials, encryption keys, passphrases, etc.), or any other information about or related to the first network. Connection information for networks created by other access points can be determined in a similar manner.

In some embodiments, the companion device can include the first network connection information of the first network in a set of connection information for a set of networks of various access points known to the companion device. For example, the set of networks can be from a home access point and a work access point, as well as other access points. The companion device can connect to a network of each access point and use that connection information to generate other connection information of another WLAN of that access point. Characteristics of networks of a same access point can have a predicted relationship that allows the companion device to predict characteristics (e.g., identifiers) of the other networks.

The set of connection information can be embodied as a set of entries (records), for example, in a data structure provided by the operating system of the companion device. One or more networks in the set of networks can be identified as "known" networks. A known network as used herein refers to one or more networks about which a device has obtained information. For example, a network to which the companion device has successfully connected may be identified as a known network. In another example, one or more wireless networks observed by the companion device via their beacon transmissions may be identified as a known network, whether or not the companion device has connected to the wireless networks. Furthermore, one or more networks in the first set of networks can be identified as "preferred" networks. A preferred network as used herein refers to one or more networks to which a device seeks to connect to automatically. For example, a home or work network to which the companion device has successfully connected may be identified as a preferred network causing the companion device to attempt to initiate connections to the home or work networks automatically.

To generate the first network connection information, the companion device can modify information from an entry for the second network based on a predicted relationship between the first and second networks. The companion device, having connected to a wireless network created by an access point using a given frequency or set of frequencies, may anticipate that other devices can connect to another wireless network created by the same access point using a different frequency or set of frequencies. For example, the companion device can determine that two wireless networks created by the same access point are related. The companion device can derive information about other wireless networks created by the same access point from information the companion device obtains during its own association process with the access point.

In some embodiments, the companion device can generate one or more variations (modifications) of a second network identifier associated with the second network to obtain the first connection information. Examples of network identifiers include a MAC address, SSID, or BSSID. As the two networks are predicted to be related, a first identifier associated with the first network can be generated according to one or more rules defined by the predicted relationship. Further, the companion device can create an association between the first identifier associated with the first network and any security information used by the companion device to connect to the second network, thereby enabling the same security information to be used during attempts to connect to the first network by the mobile device or any other devices to which the information is sent.

In certain embodiments, the companion device can modify the second identifier by increasing and/or decreasing the second identifier. For example, the first identifier for the first network using a different frequency than the second network may be slightly higher or lower than the second identifier. The identifiers may also be in a same block of values. Accordingly, the companion device can prepare the network connection information to describe one or more other networks on behalf of a mobile device by generating each of a 1 difference variation to the BSSID of a 5 GHz network (e.g., adding or subtracting 1 from the MAC address associated with the BSSID) and a 2 difference variation to the BSSID of the 5 GHz network (e.g., adding or subtracting 2 from the MAC address associated with the BSSID). The companion device can calculate the possible corresponding single band BSSIDs as follows:

predicted2ghzBssid_1=bssid−1, predicted2ghzBssid_2=bssid−2

In step 330, the companion device sends the first network connection information to a mobile device. The companion device can share with the mobile device information describing any type of network and thus enable automatic network connection features of the mobile device. The companion device can send the network connection information to the mobile device, either directly or indirectly. The mobile device may have previously established a device relationship with the companion device. In certain embodiments, the companion device can send the network connection information to the mobile devices during or subsequent to a pairing process.

The communication between the devices can be performed using various protocols. For example, the companion device can send the network connection information to the associated mobile devices using a low power link (e.g., Bluetooth low energy or BLE) between the companion device and the mobile device. In certain embodiments, the companion device sends the network connection information to a local server, a remote server, cloud-based service, or the like. The mobile device can later retrieve the network connection information from the local server, the remote server, the cloud-based service, etc. In some embodiments, the companion device can send the connection information to various mobile devices.

In step 340, the mobile device determines availability of the first network. The mobile device can determine availability of a network in response to receiving information about the network. As examples, the mobile device can receive information about a network from a user, from another device, or from observation. The mobile device can use one or more network discovery techniques to observe the availability of the network. In some embodiments, the mobile device can identify one or more WLANs based on observing one or more beacons transmitted by one or more wireless access points. In some embodiments, the mobile device can identify one or more LANs based on scanning for IP addresses in use by one or more devices. The received information can include an identifier associated with the first network (e.g., a MAC address, SSID, or BSSID).

The mobile device can initiate a network discovery process in a variety of manners and in response to a variety of events. In some embodiments, the mobile device can perform network discovery when a user enables an auto join function for the mobile device. With an auto join function enabled, the mobile device can periodically (or in response to a trigger) scan (search) for available networks. In some embodiments, the mobile device can perform network discovery when a user connects a cable (e.g., an Ethernet cable) to the mobile device.

The mobile device can perform the network discovery process to generate discovery information. Discovery information as used herein refers to information generated by a device about one or more networks discovered by the device. The discovery information can include one or more characteristics of one or more networks, such as one or more MAC addresses of one or more wired access points to the networks, one or more SSIDs/BSSIDs of one or more wireless access points to the networks (or other identifiers), one or more capabilities of the networks, and other information collected about the networks.

In step 350, the mobile device initiates one or more connections to the available first network based on the first network connection information. In some embodiments, the mobile device can initiate a connection to the available first network by determining that the available first network is described in the first network connection information obtained from the companion device. For example, the mobile device can check whether a received identifier (e.g., received from an access point as part of network discovery) matches an identifier of connection information stored in the mobile device. When the mobile device has received the first identifier in the first network connection information from the companion device, the mobile device can match the received identifier with first identifier, and then initiate a connection to the companion device. In some embodiments, the mobile device can determine not to initiate a connection to an available network (e.g., the first network) by determining that the available network is not described in network connection information obtained from the companion device (e.g., there is no matching identifier).

Accordingly, the mobile device can initiate connections to available networks in response to determining that one or more characteristics of one or more of the available networks match one or more characteristics of one or more networks described in the network connection information generated by the companion device. The mobile device can match one or more network identifiers, SSIDs/BSSIDs of wireless networks, or other collected information in the network connection information sent by the companion device to one or more of the available networks. The mobile device can initiate a connection to a known or preferred network of the companion device when the known or preferred network is determined to be available.

In optional step 360, the mobile device sends security information in the first network connection information to an authentication device associated with the first network. For example, in response to determining that a detected characteristic (e.g., first identifier) of the first network matches a characteristic of a network stored in the network connection information, the mobile device can retrieve any security information from the network connection information that corresponds to the matching network. For example, when connecting to a wireless network using the 2.4 GHz band created by a dual-band wireless access point, the mobile device may send to the dual-band wireless access point the pre-shared key or passphrase (or other security information) sent in the network connection information which was used by the companion device to connect to a wireless network using the 5 GHz band created by the same dual-band wireless access point.

The mobile device can therefore connect automatically to one or more available networks without further user input, e.g., user input after establishing a relationship with the companion device and potentially turning on any settings, such as auto-join. Accordingly, the mobile device uses the network connection information generated by the companion device for connecting to networks without requiring a user to provide any connection information or otherwise interact with the device.

III. Companion Device Prediction

In certain embodiments, a companion device can predict that one or more networks likely exist using information obtained about one or more other networks. The companion device can predict that the former networks have a relationship to the latter networks. The companion device may make such a prediction based on the latter networks satisfying a set of conditions. The set of conditions can include one or more conditions related to the network association information collected by the companion device about a second network to which the companion device has connected. As an example, the companion device can determine whether certain frequencies are used to connect to the second network. 802.11-type wireless networks typically use certain frequency ranges, such as 2.4 GHz, 3.6 GHz, 4.9 GHz, 5 GHz, and 5.9 GHz bands. The companion device may predict that a second wireless network using the 5 GHz bands is related to a first wireless network using the 2.4 GHz bands. Each range is also divided into a multitude of channels, such as 1-11 for 802.11b in North America, spaced a certain number of MHz apart. The companion device may predict that the first wireless network on a first set of channels is related to the second wireless network on a second set of channels when the channels numbers of the second set of channels exceed a threshold.

A. Network Prediction

Figure 4:
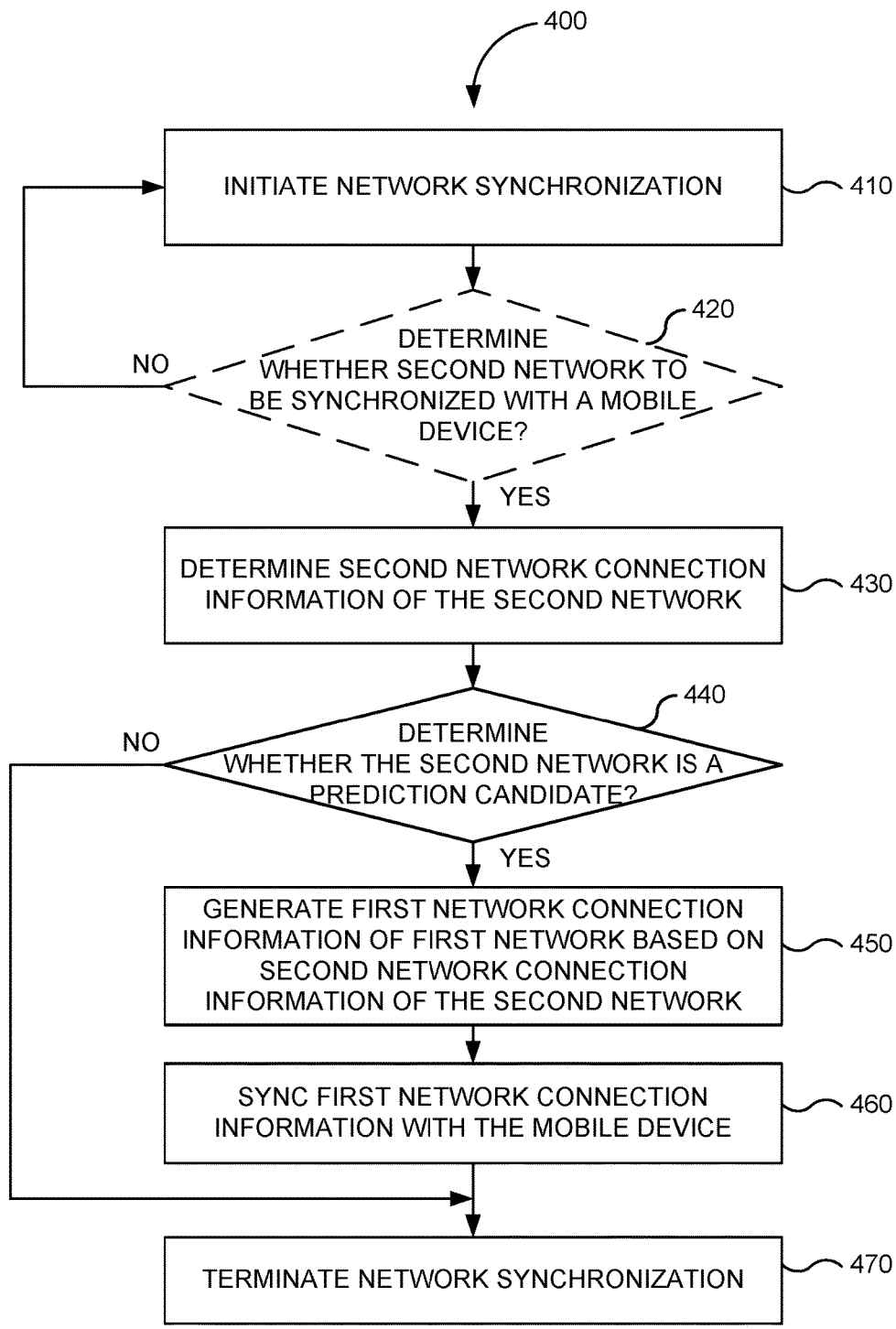
FIG. 4 is a flowchart of an example method for generating network connection information by a companion device.

FIG. 4 is a flowchart of an example method 400 for generating network connection information by a companion device. The companion device can generate a description of one network predicted to be in existence by modifying information obtained about another network. The companion device can generate one or more variations (modifications) of a network identifier, such as a MAC address or SSID/BSSID, of the second network, predicting that the first network can be identified by these variations. The companion device can also associate security information used to connect to the second network with the first network, for example, by creating an association with the newly generated variations.

In step 410, a companion device (e.g., companion device 120) initiates network synchronization. Network synchronization as used herein refers to the process of generating the first network connection information of the first network and sending the first network connection information to the mobile device to enable the mobile device to connect to the first network. The companion device can initiate the network synchronization automatically in response to one or more triggers (e.g., a periodic timer or a connection to a mobile device) or manually. In some embodiments, the companion device can initiate the network synchronization in response to a pairing event with the mobile device. In some embodiments, the network synchronization is done when new networks are encountered, which have not previously been synchronized or otherwise had connection information generated for sending to another device.

In optional step 420, the companion device determines whether the second network is to be synchronized with the mobile device. The companion device can identify networks (e.g., the second network) for synchronization that are known to the companion device and/or of related networks (e.g., a network having a different frequency from a same access point). The companion device can determine that a network can be synchronized with another device using a set of rules. For example, a user of the companion device may specifically include or exclude a network in the network synchronization. As another example, an organization or device policy can include or exclude a network in the network synchronization.

In some embodiments, the determination for synchronizing can be made based on properties of the mobile device. For example, the companion device may determine that the mobile device having a pairing relationship with the companion device lacks one or more hardware or software features that would allow the mobile device to connect to a given network, including a related network. The given network may be excluded in the network synchronization for the mobile device.

If a determination is reached in step 420 that the second network is not to be synchronized with the mobile device, method 400 can continue to step 410. The companion device may attempt the network synchronization in step 410 at a later time, e.g., when the companion device connects to another mobile device. If a determination is made in step 420 that the second network is to be synchronized with the mobile device, method 400 can proceed to step 430.

In step 430, the companion device determines the second network connection information of the second network. The second network connection information can include information identifying the second network, information about capabilities of one or more access points to the second network, and/or security information (authentication) used by the companion device to connect to or otherwise join the second network.

In step 440, the companion device determines whether the second network is a prediction candidate. A prediction candidate as used herein means a network that satisfies one or more conditions. The companion device can determine whether the second network is a prediction candidate using the second connection information. For example, the companion device can determine that a wireless network is a prediction candidate based on the frequencies used to connect to the wireless network. The companion device can determine that when the frequencies used to create the wireless exceed a predetermined threshold, a related wireless network is likely to exist. For example, when the companion device connects to the second network using the 5 GHz band, the companion device can predict that the access point of the second network also creates the first network using the lower 2.4 GHz band. If a determination is made in step 440 that the second network is not a prediction candidate, the companion device terminates the network synchronization in step 470 and does not send information about any networks related to the second network. Method 400 can be repeated for other networks known to the companion device.

In step 450, if a determination is made in step 440 that the second network is a prediction candidate, the companion device generates the first network connection information of the first network based on the second network connection information of the second network. The companion device can modify one or more network identifiers or other information about the second network to create one or more descriptions of the first network. A modification can include one or more variations to one or more characteristics of the second network, such as a variation in a network identifier, a variation to observed or discovered network capabilities, a variation in authentication and/or security parameters, or the like.

In step 460, the companion device synchronizes the first network connection information of the first network with the mobile device. The first network connection information can be synchronized with the mobile device directly or through one or more intermediaries, e.g., servers. Synchronization can be triggered in response an event, such as establishing a connection between two or more devices. The companion device therefore can send the first network connection information to other devices, enabling the other devices to determine whether to connect automatically to the first network when available. The automatic connection of the mobile device to the first network may occur without any user interaction specific to the available first network. The companion device can also send the second network connection information, e.g., if the mobile device might be able to connect to the second network. After synchronization, the method 400 can terminate at step 470.

B. Prediction Candidates for Wireless Networks

The companion device can determine that a first wireless network has a predicted relationship to a second wireless network. For example, to first connection information of a first wireless network, the companion device can modify the BSSID of a second wireless network determined from second connection information of the second wireless network.

In some implementations, after connecting to a wireless access point using a 5 GHz radio, the companion device may use information about the second wireless network created by the wireless access point on the 5 GHz band to predict that the wireless access point also creates the first wireless network on the 2.4 GHz band. In some implementations, the companion device can determine that the second wireless network is a prediction candidate because the second wireless network uses a channel number that exceeds a threshold (e.g., channel#>14). A dual band wireless access point that creates the second wireless network may also create the first wireless network on a different set of channels (e.g., 1<=channel#<=11).

It has been observed by the inventors that network identifiers (e.g., BSSIDs) of wireless networks created by most multi-band wireless access points are related. The companion device can use this observed relationship to generate the first network connection information of the first network using the second network connection information of the second network. By convention, an access point's MAC address is used as the ID of a BSSID. To accommodate multiple BSSIDs, an access point can be assigned a unique block of MAC addresses (e.g., 64). Each radio can have a set of MAC addresses and support a number of SSIDs, with one MAC address assigned to each SSID as a BSSID. MAC addresses for an access point are typically assigned based on the base MAC address of the access point. Therefore, in most instances, BSSIDs associated with the same access point fall within a range of variation from the base MAC address of the access point.

In some embodiments, the companion device prepares network connection information to be synchronized with the mobile device to describe the first network by generating a range of BSSIDs. As examples, the range could be a specific block of BSSIDs that includes a known identifier of the access point (e.g., a BSSID of a network to which the companion device has connected) or a range centered at a base MAC address of the access point. The range can exclude the known identifier.

In certain embodiments, the range can correspond to each of a 1 difference variation to the BSSID of a 5 GHz network (e.g., adding or subtracting 1 from the MAC address associated with the BSSID) and a 2 difference variation to the BSSID of the 5 GHz network (e.g., adding or subtracting 2 from the MAC address associated with the BSSID). The companion device can calculate the possible corresponding single band BSSIDs as follows:

predicted2ghzBssid_1=bssid−1 predicted2ghzBssid_2=bssid−2.

The companion device can add security information (e.g., one or more keys) corresponding to these new BSSIDs to the network connection information.

In one example, the MAC address of a BSSID of a wireless network on the 5 GHz band ends in 0x0BE4. Variations on the MAC address could end in 0x0BE3 (−1 variation), 0x0BE5 (+1 variation), 0x0BE2 (−2 variation), or 0x0BE6 (+2 variation), etc. Each of these variations might correspond to the BSSID of another wireless network on a multi-band wireless access point, e.g., one on the 2.4 GHz band. The companion device can map security information associated with the BSSID of the 5 GHz wireless network to the possible identifiers for the 2.4 GHz wireless network. The companion device can include a key-value pair for each variation in the network connection information that provides a mapping between the BSSID of the variation and the security information used by the companion device to connect to the 5 GHz wireless network.

IV. Mobile Device Network Association

After the mobile device (e.g., mobile device 115) receives the first connection information of the first wireless network, the first connection information can be used to determine whether to initiate a connection to the first wireless network. For example, when the mobile device detects the first wireless network during a wireless network discovery process, the mobile device can identify a match between an identifier of the detected first wireless network (e.g., a BSSID) and an identifier in the first connection information of the first wireless network obtained from the companion device.

A. Processing Network Connection Information Generate by Other Devices

Figure 5:
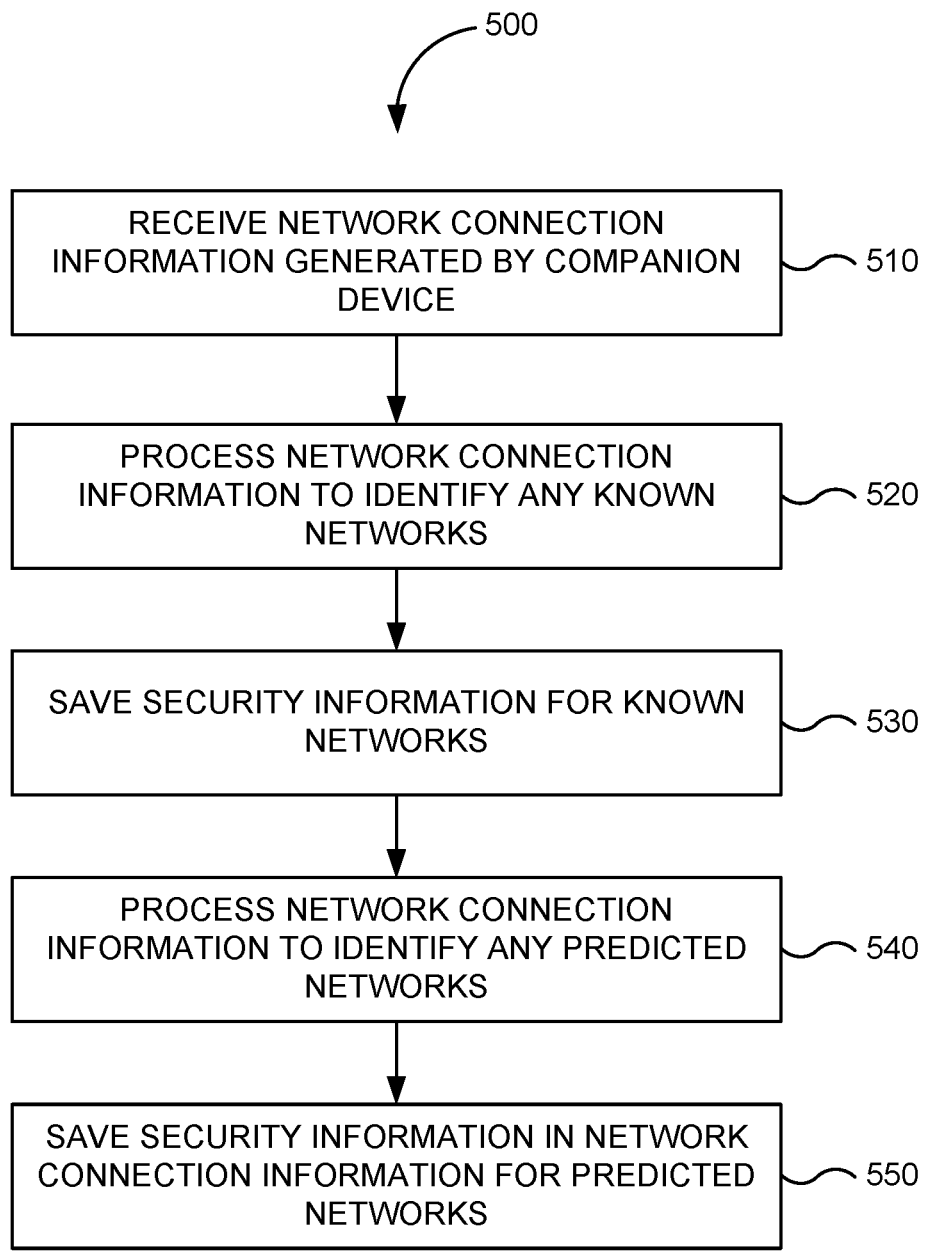
FIG. 5 is a flowchart of an example method performed by a mobile device for processing network connection information generated by a companion device.

FIG. 5 is a flowchart of an example method 500 performed by a mobile device for processing network connection information generated by a companion device. Using network connection information generated by the companion device, the mobile device can collect network association information from the network connection information generated by the companion as if the mobile device performed its own network association. The mobile device can retrieve descriptions of networks from the network connection information generated by the companion about networks that it may be able to connect to automatically.

In step 510, a mobile device (e.g., mobile device 115) receives network connection information generated by one or more companion devices (e.g., companion device 120). In various embodiments, the mobile device can receive the network connection information directly from the companion devices, or the mobile device can retrieve the network connection information from a server or service to which the network connection information was delivered by the companion devices. The network connection information can include data as described herein.

In step 520, the mobile device processes the network connection information to identify any known networks described therein. The companion device can flag or otherwise identify (e.g., by placing in a group) the known networks in the network connection information. A known network is a network about which the companion device has information, whether or not the companion device has connected to the network. In some embodiments, the network connection information can also specify any known networks that are preferred networks. A network identified as preferred can have specific settings, e.g., such that the companion device and/or mobile device will seek to automatically connect to the preferred network when available.

The mobile device can create a list of known networks embodied as a set of entries or records, for example, in a data structure provided by the operating system of the mobile device. The mobile device can add one or more known network in the network connection information to the list of networks. The list of known networks can be stored in such a manner that identifies the known networks as being known, e.g., distinguishes the known networks from predicted networks.

In step 530, the mobile device saves any security information in the network connection information for the known networks. The mobile device may store the security information retrieved from the network connection information for a given network in an authentication store, a device key chain, or the like. The security information can include any information needed by the mobile device to connect to (join) the network. Some examples of security information can include usernames and passwords, digital signatures, encryption keys, or the like. The security information for a particular known network can be associated with the known network (e.g., via an identifier of the known network).

In step 540, the mobile device processes the network connection information to identify any predicted networks. A predicted network as used herein refers to one network having a relationship with another network. The predicted networks can have a predicted relationship with networks already processed by the mobile device, e.g., the known networks. The predicted networks may be marked (flagged) as being networks created by the companion device using information the companion device has about certain networks. The other networks may be found in a separate section of the network connection information.

The mobile device can represent the predicted networks in the network connection information with a list of predicted networks embodied as a set of entries or records, for example, in a data structure provided by the operating system of the mobile device. A same data structure can be used for the predicted and known networks, e.g., with a field identifying whether a networks is known or predicted. A predicted network can be specified by a predicted identifier that may correspond to an actual network.

In some embodiments, the mobile device can use the list of networks with the predicted networks for later processing during network discovery. Rather than creating a new network entry for a network that has a possibility of not being in existence, the mobile device can separate and cache the information generated by the companion device about the predicted networks in a separate list of networks.

In step 550, the mobile device saves any security information in the network connection information for the predicted networks. The mobile device may store the security information in an authentication store, a device key chain, or the like. The security information can include any information needed by the mobile device to connect to (join) the other networks. Some examples of security information can include usernames and passwords, digital signatures, encryption keys, or the like. In certain embodiments, the mobile device can create a mapping between the other networks and the stored security information of the known or preferred networks.

Figure 6:
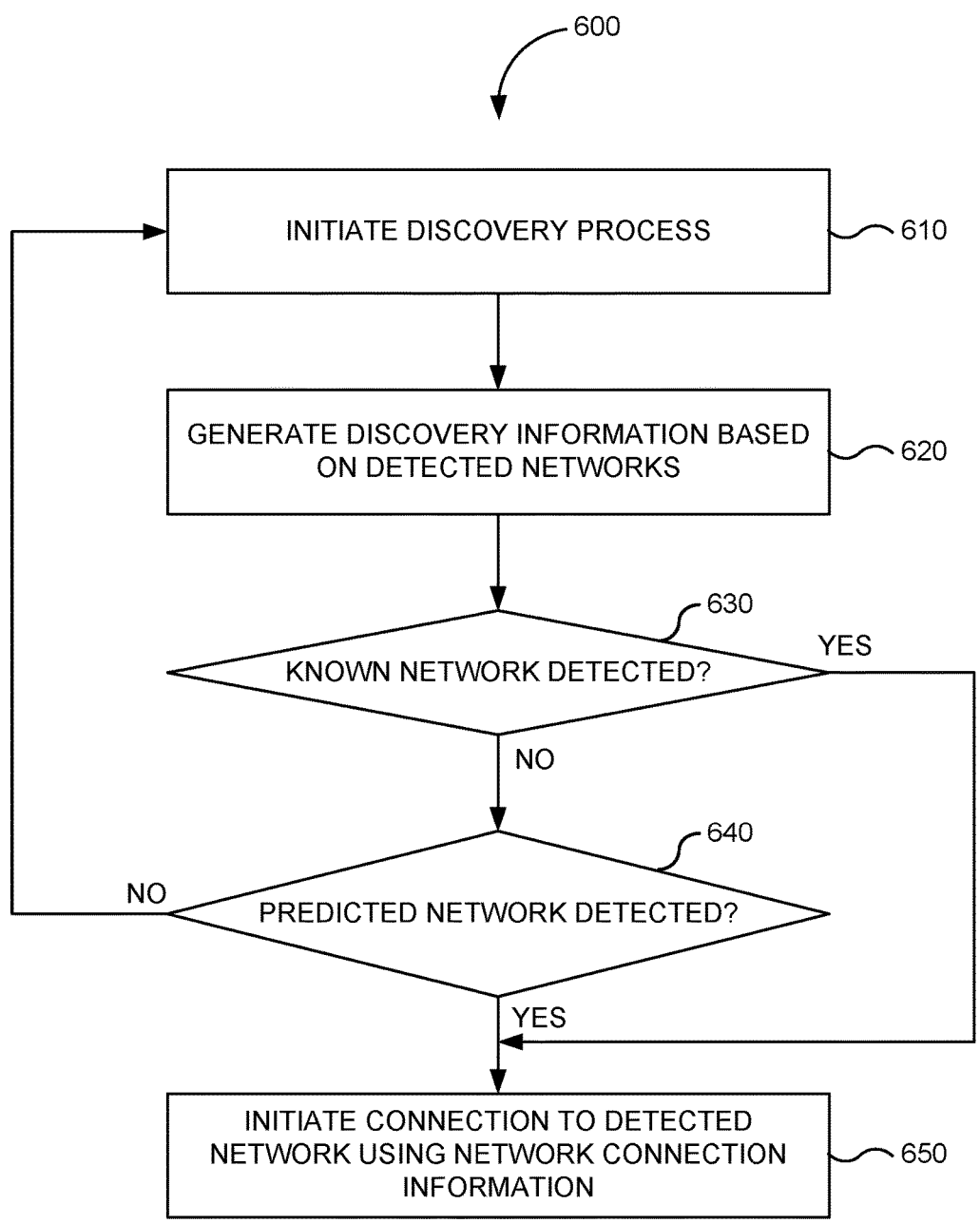
FIG. 6 is a flowchart of an example method for connecting to networks by a mobile device.

B. Network Association Using Network Connection Information Generate by Other Devices FIG. 6 is a flowchart of an example method 600 for connecting to networks by a mobile device. Using the processed description of a network generated by the companion device, the mobile device can determine whether to initiate one or more connections to a network without user input or intervention. In certain embodiments, the mobile device can detect the presence or availability of one or more wireless networks. The mobile device can determine whether one or more of the detected wireless networks are identified in the network connection information generated by the companion device. The mobile device may identify a match between the wireless network identifier associated with the first wireless network and a wireless network identifier associated with a detected wireless network. If a match is found, the mobile device can initiate one or more connections to the detected network.

In step 610, a mobile device (e.g., mobile device 115) initiates a network discovery process. A network discovery process as used herein refers to a process of obtaining information about one or more networks. The mobile device can receive information about a network from a user, from another device, or from observation. A network discovery technique can observe the availability of a network.

In various embodiments, the mobile device can identify one or more WLANs based on observing one or more beacons transmitted by one or more wireless access points or based on scanning for IP address in use by one or more devices. The network discovery process can be initiated at various intervals, e.g., as determined by an operating system or control system. The network discovery process also may be initiated directly by a user or in conjunction with the user enabling a network interface.

In step 620, the mobile device generates discovery information based on one or more detected networks. Discovery information as used herein refers to information generated by a device about one or more networks detected by the device. The discovery information can include one or more characteristics of the networks, such as one or more SSIDs/BSSIDs of one or more wireless networks (or other identifiers), one or more capabilities of the networks, and other information collected about the networks.

In some embodiments, the mobile device can detect networks to which the mobile device has already connected. In some embodiments, the mobile device can detect networks to which the mobile device has not already connected nor identified. The mobile device may choose to process the detected networks using a hierarchy or priority.

In step 630, the mobile device determines whether any known networks have been detected. In some embodiments, the mobile device can search known network connection information stored on the mobile device to identify a match with the discovery information. For example, one or more detected characteristics (e.g., a detected identifier) of a discovered network can match one or more characteristics (e.g., an identifier) of a known network stored in the known network connection information. The match can identify the detected network as a known network.

The known network connection information can have a flag, field, or other designation that identifies the known network connection information as being for known networks. A known network may be one that the mobile device has previously connected. In some embodiments, the user of the mobile device can be given an option to connect to the known network. The known networks can include preferred networks to which connection is automatic. For example, a home or work network to which the companion device has successfully connected may be identified as a preferred network causing the companion device to attempt to initiate connections to the home or work networks automatically.

If a determination is made in step 630 that a known network has been detected, in step 650, the mobile device can initiate a connection to the detected network, which may include using the known network connection information of the matching known network. The mobile device can use security information synchronized by the companion device to connect automatically to the detected network.

If a determination is made in step 630 that a known network has not been detected, in step 640 the mobile device determines whether a predicted network has been detected. The mobile device can determine whether any detected networks are found in predicted network connection information, e.g., generated by the companion device. For example, the mobile device can identify whether one or more characteristics (e.g., an identifier) of the detected network match one or more characteristics of a predicted network in the predicted network connection information. The predicted network connection information can have a flag, field, or other designation that identifies the predicted network connection information as being for predicted networks.

If a determination is made in step 640 that a predicted networks has been detected, in step 650, the mobile device initiates a connection to the detected network, which may include using the predicted network connection information of the matching predicted network. As with known networks, the mobile device can use security information synchronized by the one or more companion devices to connect automatically to the detected network.

C. Characteristics Matching Between Detected Networks and Networks Described in Network Connection Information Generated by Other Device In certain embodiments, the mobile device's auto-association process can match characteristics of an available network to determine whether a predicted network described in the network connection information has been detected. In a matching stage of the auto-association process, the mobile device can piggyback on the scan results to determine which networks in the scan results can be connected to because the networks have a matching entry in a list of prediction candidates in the network connection information. The mobile device can then take action, such as attempt to automatically associate with the network and potentially adding the matching network to a list of known networks, or even preferred networks. The mobile device can also store security information for the matching network in an authentication store, such as a device or user keychain.

Figure 7:
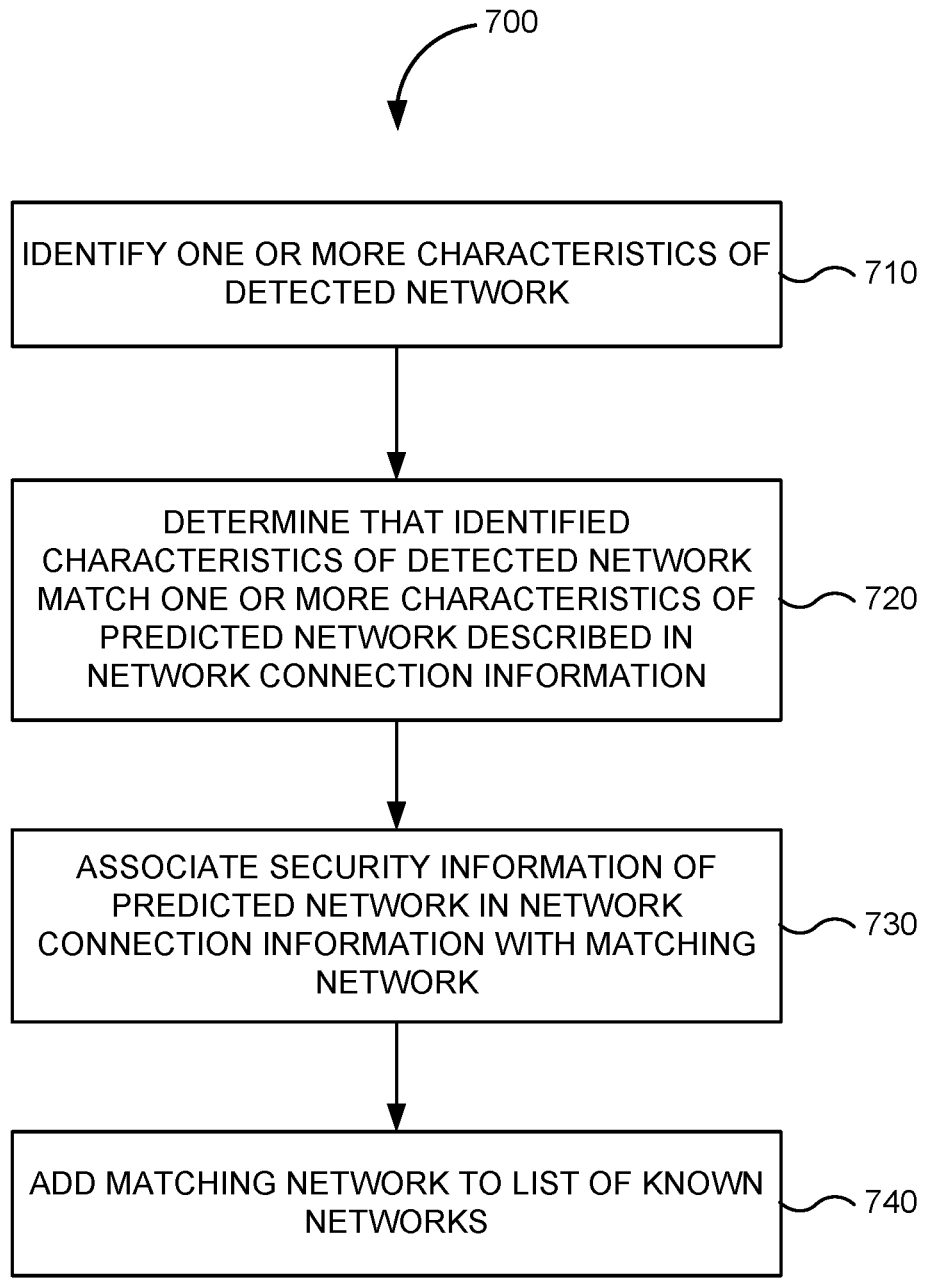
FIG. 7 is a flowchart of an example method for using network connection information generated by a companion device to determine how to connect to predicted networks by a mobile device.

FIG. 7 is a flowchart of an example method 700 for using network connection information generated by a companion device to determine how to connect to predicted networks by a mobile device. The mobile device can determine that one or more characteristics of networks described in the network connection information generated by the companion device matches one or more characteristics of one or more networks detected by the mobile device. In some embodiments, method 700 may be performed when available networks do not include any networks known to the mobile device.

In step 710, the mobile device identifies one or more characteristics of a detected network. Some examples of the characteristics include one or more SSIDs/BSSIDs of one or more wireless networks (or other identifiers), one or more network media types, one or more network protocols, one or more advertised capabilities or security parameters, latency information, topology information, network traffic information, or the like. The mobile device may identify the characteristics of the detected network through observation. The mobile device may receive a set of characteristics of a network as a result of a query, in a broadcast beacon, or the like.

In step 720, the mobile device determines that the identified characteristics of the detected network match one or more characteristics of a predicted network described in the network connection information, e.g., generated by the companion device. The mobile device may search through a list of predicted networks in the network connection information to determine whether there is a match with the detected network. Two networks can be considered a match if one or more criteria are met. This can include identical network identifiers (BSSIDs), network identifiers (BSSIDs) having the same base address, similar capabilities, or the like.

In step 730, the mobile device associates any security information of the predicted network in the network connection information with a matching network. The mobile device may store the security information for the predicted network in an authentication store, a device key chain, or the like, in association with the matching network. The mobile device can generate an association between the matching network and security information the mobile device has already associated with a known network in the authentication store. The mobile device may connect to the detected network using the security information at this point, or at a later time.

In step 740, the mobile device adds the matching network to its list of known networks. The list of known networks can be embodied as a set of entries or records, for example, in a data structure provided by the operating system of the mobile device. The matching network(s) can be stored in such a manner that identifies the networks as being known, e.g., distinguishes the networks such that the mobile device initiates one or more connections to the known network when the known network becomes available.

Various embodiments leverage the trend of customer access points being multi-band devices. These multi-band access points likely create multiple wireless networks on the same subnet using different bands (e.g., 2.4 GHz and 5 GHz). For example, single band devices (e.g., wearable devices) can automatically associate to a wireless network created on one band (e.g., the 2.4 GHz band) by a multi-band wireless access point based on knowledge that a companion device has about a wireless network created on another band (e.g., the 5 GHz band). This lets mobile devices be on the same subnet as companion devices, thus facilitating synchronization and enhancing performance.

Devices can learn thus how to connect automatically to one or more networks using network connection information generated by other devices. This can enhance the utility and ease of use for some wearable devices that might not have a convenient user interface for joining a network. Some mobile devices, particularly those that communicate with a wireless interface on a single band or frequency, can thus learn about how to join various networks using network connection information generated by other devices about other networks. Companion devices can connect to networks that provide better throughput and a better overall user experience and share their network connection information with other mobile devices. A single band device, which may be a wearable device, can learn how to connect to one or more networks its one or more multi-band companions predict to be in existence using information the companion devices obtain about other networks.

V. Example Device

Figure 8:
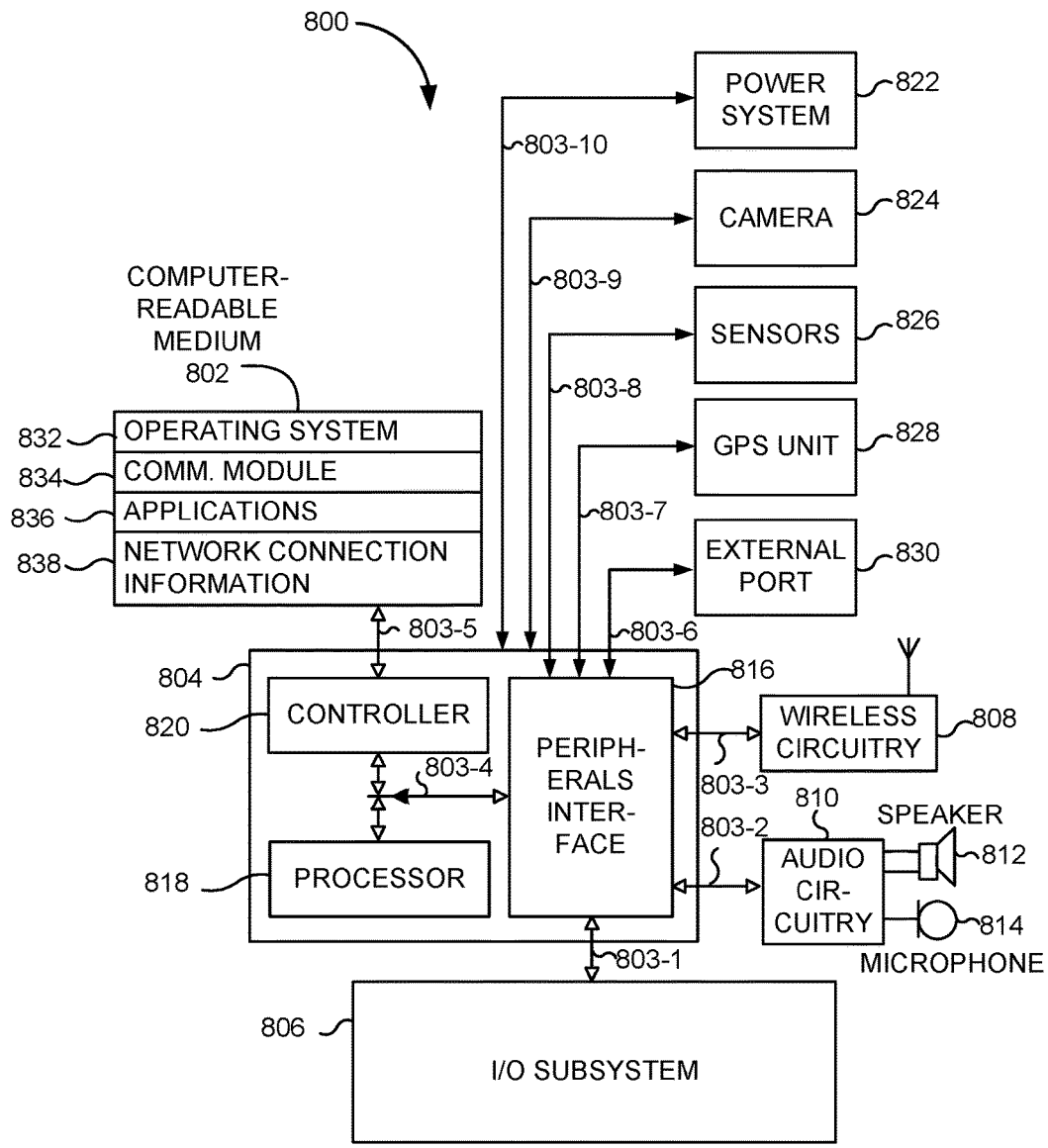
FIG. 8 is a block diagram of an example portable electronic device that can be used as either or both of a companion device and a mobile device.

FIG. 8 is a block diagram of an example portable electronic device 800 that can be used as either or both of a companion device and a mobile device. Device 800 generally includes computer-readable medium 802, a processing system 804, an Input/Output (I/O) subsystem 806, wireless circuitry 808, and audio circuitry 810 including speaker 812 and microphone 814. These components may be coupled by one or more communication buses or signal lines 803. Device 800 can be any portable electronic device, including a handheld computer, a tablet computer, a mobile phone, laptop computer, tablet device, media player, personal digital assistant (PDA), a key fob, a car key, an access card, a multi-function device, a mobile phone, a portable gaming device, or the like, including a combination of two or more of these items.

It should be apparent that the architecture shown in FIG. 8 is only one example for device 800, and that device 800 can have more or fewer components than shown, or a different configuration of components. The various components shown in FIG. 8 can be implemented in hardware, software, or a combination of both hardware and software, including one or more signal processing and/or application specific integrated circuits.

Wireless circuitry 808 is used to send and receive information over a wireless link or network to one or more other devices' conventional circuitry such as an antenna system, an RF transceiver, one or more amplifiers, a tuner, one or more oscillators, a digital signal processor, a CODEC chipset, memory, etc. Wireless circuitry 808 can be used to send network connection information generated by device 800 to another device or receive from the other device network connection information generated by the other device. In some embodiments, wireless circuitry 808 is a communications interface capable of establishing and maintaining communications with other devices using one or more communication protocols, including time division multiple access (TDMA), code division multiple access (CDMA), global system for mobile communications (GSM), Enhanced Data GSM Environment (EDGE), wideband code division multiple access (W-CDMA), Long Term Evolution (LTE), LTE-Advanced, WiFi (such as IEEE 802.11a, IEEE 802.11b, IEEE 802.11g, IEEE 802.11n and/or IEEE 802.11ac), Bluetooth, Wi-MAX, voice over Internet Protocol (VoIP), near field communication protocol (NFC), a protocol for email, instant messaging, and/or a short message service (SMS), or any other suitable communication protocol, including communication protocols not yet developed as of the filing date of this document. A mobile device can include wireless circuitry that can communicate over several different types of wireless networks depending on the range required for the communication. For example, a short-range wireless transceiver (e.g., Bluetooth), a medium-range wireless transceiver (e.g., WiFi), and/or a long-range wireless transceiver (e.g., GSM/GPRS, UMTS, CDMA2000 1x/EV-DO and LTE/LTE-Advanced) can be used depending on the type of communication or the range of the communication.

Wireless circuitry 808 is coupled to processing system 804 via peripherals interface 816. Peripherals interface 816 can include conventional components for establishing and maintaining communication between peripherals and processing system 804. Voice and data information received by wireless circuitry 808 (e.g., in speech recognition or voice command applications) is sent to one or more processors 818 via peripherals interface 816. One or more processors 818 are configurable to process various data formats.

Peripherals interface 816 couples the input and output peripherals of device 800 to the one or more processors 818 and computer-readable medium 802. One or more processors 818 communicate with computer-readable medium 802 via a controller 820. Computer-readable medium 802 can be any device or medium that can store code and/or data for use by one or more processors 818. Computer-readable medium 802 can include a memory hierarchy, including cache, main memory, and secondary memory. The memory hierarchy can be implemented using any combination of RAM (e.g., SRAM, DRAM, DDRAM), ROM, FLASH, magnetic and/or optical storage devices, such as disk drives, magnetic tape, CDs (compact disks) and DVDs (digital video discs). In some embodiments, peripherals interface 816, one or more processors 818, and controller 820 can be implemented on a single chip, such as processing system 804. In some other embodiments, they can be implemented on separate chips.

Device 800 also includes a power system 822 for powering the various hardware components. Power system 822 can include a power management system, one or more power sources (e.g., battery, alternating current (AC)), a recharging system, a power failure detection circuit, a power converter or inverter, a power status indicator (e.g., a light emitting diode (LED)) and any other components typically associated with the generation, management and distribution of power in mobile devices.

In some embodiments, device 800 includes a camera 824. In some embodiments, device 800 includes sensors 826. Sensors can include accelerometers, compass, gyrometer, pressure sensors, audio sensors, light sensors, barometers, and the like. Sensors 826 can be used to sense location aspects, such as auditory or light signatures of a location. In some embodiments, device 800 can include a GPS receiver, sometimes referred to as a GPS unit 828. A mobile device can use a satellite navigation system, such as the Global Positioning System (GPS), to obtain position information, timing information, altitude, or other navigation information. In some embodiments, device 800 can include external port 830 (e.g., USB, FireWire, Lightning connector, 80-pin connector, etc.). External port 830 can be adapted for coupling directly to other devices or indirectly over a network (e.g., the Internet, wireless LAN, etc.).

One or more processors 818 run various software components stored in computer-readable medium 802 to perform various functions for device 800. In some embodiments, the software components include operating system 832, communication module (or set of instructions) 834, other applications (or set of instructions) 836, and network connection information 838. Operating system 832 can be any suitable operating system, including iOS, Mac OS, Darwin, RTXC, LINUX, UNIX, OS X, WINDOWS, or an embedded operating system such as VxWorks. The operating system can include various procedures, sets of instructions, software components, and/or drivers for controlling and managing general system tasks (e.g., memory management, storage device control, power management, etc.) and facilitates communication between various hardware and software components.

Communication module 834 facilitates communication with one or more other devices over external port 830 or via wireless circuitry 808 and includes various software components for handling data received from wireless circuitry 808 and/or external port 830.

The one or more applications 836 on device 800 can include any applications installed on the device 800, including without limitation, a browser, address book, contact list, email, instant messaging, social networking, word processing, keyboard emulation, widgets, JAVA-enabled applications, encryption, digital rights management, voice recognition, voice replication, a music player (which plays back recorded music stored in one or more files, such as MP3 or AAC files), etc.

Network connection information 838 on device 800 can include information collected about one or more networks detected by device 800 using wireless circuitry 808. Network connection information 838 can include information generated about a first network having a predicted relationship to a second network. As a companion device, device 800 can generate first network connection information of the first network according to the predicted relationship using second network connection information collected about the second network using wireless circuitry 808 and stored in network connection information 838. Device 800 can then send all or part of network connection information 838 to a mobile device to enable the mobile device to automatically connect to a network(s) described therein. As the mobile device, device 800 can store in network connection information 838 information generated by the companion device. Device 800 can then automatically connect to the network(s) described therein.

There may be other modules or sets of instructions (not shown), such as a graphics module, a time module, etc. For example, the graphics module can include various conventional software components for rendering, animating and displaying graphical objects (including without limitation text, web pages, icons, digital images, animations, and the like) on a display surface. In another example, a timer module can be a software timer. The timer module can also be implemented in hardware. The time module can maintain various timers for any number of events.

I/O subsystem 806 can be coupled to a display system (not shown), which can be a touch-sensitive display. The display displays visual output to the user in a GUI. The visual output can include text, graphics, video, and any combination thereof. Some or all of the visual output can correspond to user-interface objects. A display can use LED (light emitting diode), LCD (liquid crystal display) technology, or LPD (light emitting polymer display) technology, although other display technologies can be used in other embodiments.

In some embodiments, I/O subsystem 806 can include a display and user input devices such as a keyboard, mouse, and/or trackpad. In some embodiments, I/O subsystem 806 can include a touch-sensitive display. A touch-sensitive display can also accept input from the user based on haptic and/or tactile contact. In some embodiments, a touch-sensitive display forms a touch-sensitive surface that accepts user input. The touch-sensitive display/surface (along with any associated modules and/or sets of instructions in computer-readable medium 802) detects contact (and any movement or release of the contact) on the touch-sensitive display and converts the detected contact into interaction with user-interface objects, such as one or more soft keys, that are displayed on the touch screen when the contact occurs. In some embodiments, a point of contact between the touch-sensitive display and the user corresponds to one or more digits of the user. The user can make contact with the touch-sensitive display using any suitable object or appendage, such as a stylus, pen, finger, and so forth. A touch-sensitive display surface can detect contact and any movement or release thereof using any suitable touch sensitivity technologies, including capacitive, resistive, infrared, and surface acoustic wave technologies, as well as other proximity sensor arrays or other elements for determining one or more points of contact with the touch-sensitive display.

Further, I/O subsystem 806 can be coupled to one or more other physical control devices (not shown), such as push-buttons, keys, switches, rocker buttons, dials, slider switches, sticks, LEDs, etc., for controlling or performing various functions, such as power control, speaker volume control, ring tone loudness, keyboard input, scrolling, hold, menu, screen lock, clearing and ending communications and the like. In some embodiments, in addition to the touch screen, device 800 can include a touchpad (not shown) for activating or deactivating particular functions. In some embodiments, the touchpad is a touch-sensitive area of the device that, unlike the touch screen, does not display visual output. The touchpad can be a touch-sensitive surface that is separate from the touch-sensitive display or an extension of the touch-sensitive surface formed by the touch-sensitive display.

The foregoing description may make reference to specific examples of a mobile device (e.g., a wrist-worn device) and/or a companion device (e.g., a smart phone). It is to be understood that these examples are illustrative and not limiting. Other devices can be substituted and can implement similar functions and/or algorithms to perform operations described herein and/or other operations.

Embodiments of the present disclosure, e.g., in methods, apparatus, computer-readable media and the like, can be realized using any combination of dedicated components and/or programmable processors and/or other programmable devices. The various processes described herein can be implemented on the same processor or different processors in any combination. Where components are described as being configured to perform certain operations, such configuration can be accomplished, e.g., by designing electronic circuits to perform the operation, by programming programmable electronic circuits (such as microprocessors) to perform the operation, or any combination thereof. Further, while the embodiments described above may make reference to specific hardware and/or software components, those skilled in the art will appreciate that different combinations of hardware and/or software components may also be used and that particular operations described as being implemented in hardware might also be implemented in software or vice versa.

Computer programs incorporating various features of the present invention may be encoded and stored on various computer readable storage media; suitable media include magnetic disk or tape, optical storage media such as compact disk (CD) or digital versatile disk (DVD), solid-state memory, flash memory, and other non-transitory media. Computer readable media encoded with the program code may be packaged with a compatible electronic device, or the program code may be provided separately from electronic devices (e.g., via Internet download or as a separately packaged computer-readable storage medium).

Thus, although the disclosure has been described with respect to specific embodiments, it will be appreciated that the disclosure is intended to cover all modifications and equivalents within the scope of the following claims.

A recitation of "a", "an" or "the" is intended to mean "one or more" unless specifically indicated to the contrary. The use of "or" is intended to mean an "inclusive or," and not an "exclusive or" unless specifically indicated to the contrary.

What is claimed is:
1. A method comprising:
 maintaining, by a first device, a first identifier associated with a first wireless network provided by an access point;
 determining, by the first device, an item of security information used to connect to the first wireless network;

generating, by the first device, a second identifier using the first identifier, wherein the second identifier is generated based at least in part on a relationship between the first wireless network and a second wireless network provided by the access point; and sending, by the first device, the second identifier and the item of security information to a second device, the second identifier being configured to enable the second device to connect automatically to the second wireless network using the item of security information.

2. The method of claim 1, wherein generating the second identifier using the first identifier comprises modifying the first identifier, the first identifier and the second identifier comprising addresses within a block of media access control (MAC) addresses.

3. The method of claim 1, wherein generating the second identifier using the first identifier comprises generating one or more identifiers by altering a value of a media access control (MAC) address associated with the access point.

4. The method of claim 3, wherein altering the value of the MAC address comprises decreasing the value of the MAC address.

5. The method of claim 1, further comprising:
generating an association between the second identifier and an item of security information used to connect to the first wireless network; and
sending the item of security information to the second device to enable the second device to connect automatically to the second wireless network.

6. The method of claim 5, wherein the item of security information comprises a wired equivalent privacy (WEP) key, a Wi-Fi protected access (WPA) key, or a Wi-Fi protected access 2 (WPA2) key.

7. The method of claim 1, further comprising:
establishing a device relationship with the second device; and
determining, based at least in part on the device relationship, whether to send the second identifier associated with the second wireless network to the second device.

8. The method of claim 1, wherein sending the second identifier to the second device comprises sending the second identifier to one or more servers to enable the second device to retrieve, from the one or more servers, network connection information that includes the second identifier.

9. A first mobile device, comprising:
a wireless communications interface configured to communicate with a second mobile device and a first wireless network provided by an access point, the first mobile device configured to establish a relationship with the second mobile device; and
one or more processors configured to:
identify a first identifier associated with the first wireless network to which the wireless communications interface has connected;
determine an item of security information used to connect to the first wireless network;
generate, based at least in part on a relationship between the first wireless network and a second wireless network provided by the access point, wireless network identifiers associated with the second wireless network, at least one of the wireless network identifiers matching a second identifier associated with the second wireless network; and
send network connection information to the second mobile device, the network connection information including the wireless network identifiers and the item of security information, and the network connection information enabling the second mobile device to connect to the second wireless network using the item of security information and the one of the wireless network identifiers that matches the second identifier.

10. The first mobile device of claim 9, wherein the wireless network identifiers are generated by modifying the first identifier associated with the first wireless network such that the first identifier and the wireless network identifiers comprise addresses within a block of media access control (MAC) addresses.

11. The first mobile device of claim 9, wherein the wireless network identifiers are generated by generating a plurality of identifiers of successively increasing value, starting by increasing the value of the first identifier.

12. The first mobile device of claim 9, wherein the wireless network identifiers are generated by generating a plurality of identifiers of successively decreasing value, starting by decreasing the value of the first identifier.

13. The first mobile device of claim 9, wherein the one or more processors are further configured to generate an association between the one of the wireless network identifiers and the security information, and wherein the network connection information includes the association.

14. The first mobile device of claim 9, wherein sending the network connection information to the second mobile device comprises sending the network connection information to one or more servers to enable the second mobile device to retrieve, from the one or more servers, the network connection information.

15. A non-transitory computer-readable storage medium storing a plurality of instructions that, when executed, control a first mobile device to establish a relationship with a second mobile device, the instructions comprising:
identifying a first identifier associated with a first wireless network to which a wireless communications interface of the first mobile device has connected, the first wireless network provided by an access point;
determining an item of security information used to connect to the first wireless network;
generating, based at least in part on a relationship between the first wireless network and a second wireless network provided by the access point, wireless network identifiers for the second wireless network, at least one of the wireless network identifiers matching a second identifier associated with the second wireless network; and
sending network connection information to the second mobile device, the network connection information including the wireless network identifiers and the item of security information, and the network connection information enabling the second mobile device to connect to the second wireless network using the item of security information and the one of the wireless network identifiers that matches the second identifier.

16. The non-transitory computer-readable storage medium of claim 15, wherein generating the wireless network identifiers comprises modifying the first identifier to obtain the wireless network identifiers, and wherein the first identifier and the wireless network identifiers comprise addresses within a block of consecutive media access control (MAC) addresses.

17. The non-transitory computer-readable storage medium of claim 15, wherein generating the wireless network identifiers comprises generating a plurality of identifiers of successively increasing value, starting by increasing the value of the first identifier.

18. The non-transitory computer-readable storage medium of claim 15, wherein generating the wireless network identifiers comprises generating a plurality of identifiers of successively decreasing value, starting by decreasing the value of the first identifier.

19. The non-transitory computer-readable storage medium of claim 15, wherein the instructions further comprise:
   generating an association between the one of the wireless network identifiers and the item of security information, wherein the network connection information includes the association.

20. The non-transitory computer-readable storage medium of claim 15, wherein sending the network connection information to the second mobile device comprises sending the network connection information to one or more servers to enable the second mobile device to retrieve, from the one or more servers, the network connection information.

* * * * *